US009891334B2

(12) United States Patent
Sinha et al.

(10) Patent No.: US 9,891,334 B2
(45) Date of Patent: Feb. 13, 2018

(54) SYSTEM AND METHODOLOGY FOR DETERMINING FRACTURE ATTRIBUTES IN A FORMATION

(71) Applicant: Schlumberger Technology Corporation, Sugar land, TX (US)

(72) Inventors: Bikash K. Sinha, Cambridge, MA (US); Ting Lei, Cambridge, MA (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 827 days.

(21) Appl. No.: 14/246,144

(22) Filed: Apr. 7, 2014

(65) Prior Publication Data

US 2015/0285936 A1 Oct. 8, 2015

(51) Int. Cl.
*H04K 3/00* (2006.01)
*G01V 1/50* (2006.01)
*G01V 1/44* (2006.01)

(52) U.S. Cl.
CPC . *G01V 1/50* (2013.01); *G01V 1/44* (2013.01)

(58) Field of Classification Search
USPC ......................................................... 367/35
See application file for complete search history.

(56) References Cited

U.S. PATENT DOCUMENTS

| 5,999,486 A * | 12/1999 | Devault ................. G01V 1/284 367/36 |
| 6,049,759 A * | 4/2000 | Etgen ..................... G01V 1/301 702/14 |
| 6,611,761 B2 | 8/2003 | Sinha et al. |
| 7,035,165 B2 * | 4/2006 | Tang ....................... G01V 1/44 367/25 |
| 2013/0201795 A1 * | 8/2013 | Zhou ..................... G01V 1/284 367/75 |

OTHER PUBLICATIONS

Thomsen, Leon. "Weak elastic anisotropy." Geophysics 51.10 (1986): 1954-1966.*
Lei, Ting, and Bikash K. Sinha. "Fracture-induced anisotropy and reflectivity of elastic waves in a fluid-filled borehole." 2013 SEG Annual Meeting. Society of Exploration Geophysicists, 2013.*

(Continued)

*Primary Examiner* — James R Hulka
*Assistant Examiner* — Jonathan D Armstrong
(74) *Attorney, Agent, or Firm* — Trevor G. Grove

(57) ABSTRACT

A technique facilitates determination of fracture attributes through the recording and analyzing of borehole sonic data before and after a fracturing operation. The technique comprises generating broadband acoustic waves at an array of receivers based on output from a plurality of acoustic sources. The waveforms of the broadband acoustic waves are recorded and processed to estimate sonic signatures. The sonic signatures are then used to determine fracture attributes. In some applications, the data may be used to determine whether the fractures in the formation are filled with fluid or soft sediments. Information on the fracture attributes is output to a suitable system, e.g. a computer display.

6 Claims, 19 Drawing Sheets

(56) References Cited

OTHER PUBLICATIONS

Yang, Jiaqi, et al. "Estimation of the formation shear and borehole fluid slownesses using sonic dispersion data in the presence of a drill collar." SEG Technical Program Expanded Abstracts 2011. Society of Exploration Geophysicists, 2011. 464-468.*
Williams, Kevin L. "An effective density fluid model for acoustic propagation in sediments derived from Biot theory." The Journal of the Acoustical Society of America 110.5 (2001): 2276-2281.*
Braunisch, H., Habashy, T.M., Sinha, B.K., Pabon, J., and Kong, J.A., "Inversion of guided-wave dispersion data with application to borehole acoustics", J. Acoust. Soc. Am., 115(1), 2004, pp. 269-279.
Ekstrom, M.P., "Dispersion estimation from borehole acoustic arrays using a modified matrix pencil algorithm", 29th Asilomar Conf. on Signals, Systems, and Computers, Pacific Grove, CA, Oct. 31, 1995, pp. 449-453.
Hsu, C.-J. and Schoenberg, M., "Elastic waves through a simulated fractured medium", Geophysics, 58, 1993, pp. 964-977.
Lei, T., and Sinha, B.K., "Hydraulic fracture induced changes in borehole dispersions", 2012 IEEE International Ultrasonics Symposium Proceedings, Dresden, Germany pp. 174-177.

Pistre, V., T. Plona, B.K. Sinha, T. Kinoshita, H. Tashiro, T. Ikegami, J. Pabon, S. Zeroug, R. Shenoy, T. Habashy, H. Sugiyama, A. Saito, C. Chang, D. Johnson, H.P. Valero, C.J. Hsu, S. Bose, H. Hori, C. Wang, T. Endo, H. Yamamoto, and K. Schilling, "A new sonic modular tool provides complete acoustic formation characterization," 2005 SEG International Exposition and Annual Meeting Proceedings, SEG Houston, Nov. 6-11, 2005, pp. 368-372.
Schoenberg, M. and Sayers, C.M., 1995, "Seismic anisotropy of fractured rock", Geophysics, 60, pp. 204-211.
Sinha, B.K., A. Datey, and B. Glassborow, "Hydraulic fracture characterization using cased-hole sonic data", SPWLA 52nd Annual Logging Symposium Proceedings, Colorado Springs, May 14-18, 2011.
Sinha, B.K., "Sensitivity and inversion of borehole flexural dispersion for formation parameters", Geophysical Journal International, 1997, pp. 84-96.
Tellez, O., Castellanos, J., Casadiego, A., Lopez, E., Sorensen, F., Kessler, C., and Torne, J.P., "Application of dipole sonic to evaluate hydraulic fracturing", SPE paper 108479, 2007 SPE International Oil Conference and Exhibition, Veracruz, Mexico, Jun. 27-30.

* cited by examiner

FIG. 18

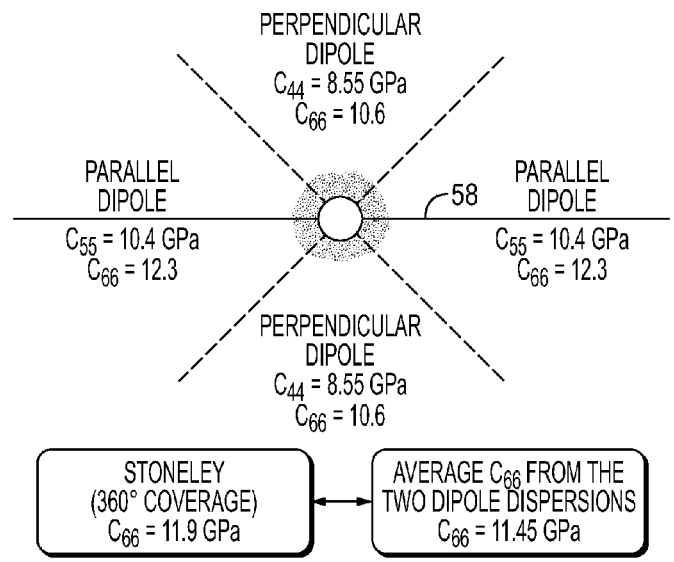

| PARAMETER | TECHNIQUE |
|---|---|
| FRACTURE STRIKE / PLANE | • FAST-SHEAR AZIMUTH<br>• FAST DIPOLE PARALLEL TO FRACTURE PLANE<br>• SLOW DIPOLE PERPENDICULAR TO FRACTURE PLANE |
| FRACTURE HEIGHT | AXIAL EXTENT OF DIPOLE SHEAR ANISOTROPY |
| FRACTURE LENGTH | • SHORT FRACTURES (< 1 m):<br>   - MULTIPLE FAST FLEXURAL MODES / REFLECTIONS<br>   - LARGER DIPOLE SLOWNESSES AT HIGHER FREQUENCIES<br>• LONG FRACTURES (> 1 m):<br>   - TIH ANISOTROPY SIGNATURES |
| FRACTURE WIDTH | WEAK SENSITIVITY |

FIG. 19

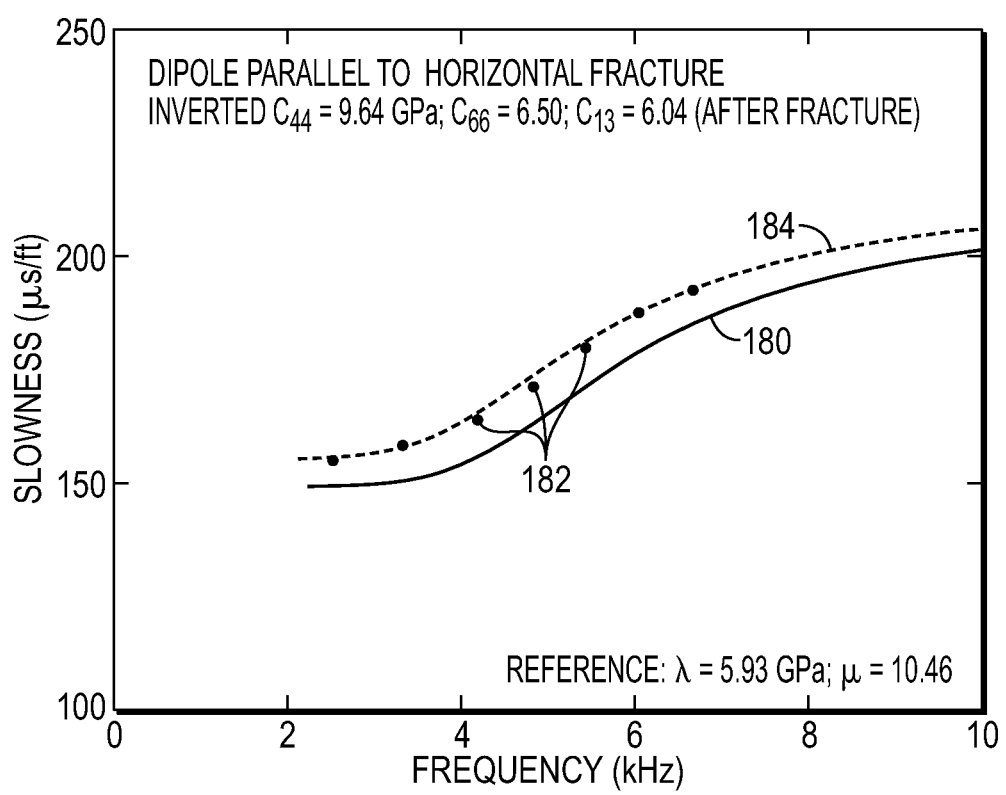

FIG. 30

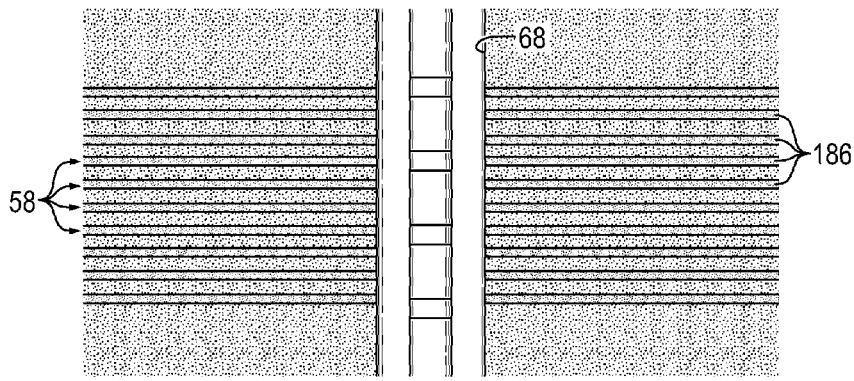

FIG. 31

| PARAMETER | TECHNIQUE |
|---|---|
| FRACTURE STRIKE / PLANE | • REFLECTION OF MONOPOLE AND DIPOLE WAVES<br>• NO DIPOLE SHEAR ANISOTROPY (TIV SIGNATURE) |
| FRACTURE LENGTH | LONG FRACTURES (> 1 m):<br>  – TIV ANISOTROPY SIGNATURES<br>SHORT FRACTURES (< 1 m):<br>  – INCOHERENT DISPERSIONS |
| MULTIPLE FRACTURES FILLED WITH MUD | • STONELEY AND DIPOLE DISPERSIONS FASTER AT ALL FREQUENCIES<br>• LARGE ATTENUATION ACROSS THE RECEIVER ARRAY |
| FRACTURES FILLED WITH SOFT (LIKE LOOSE SAND) SEDIMENTS | • STONELEY AND DIPOLE DISPERSIONS SLOWER AT ALL FREQUENCIES<br>• LESS ATTENUATION WITH SEDIMENT-FILLED FRACTURES |

SYSTEM AND METHODOLOGY FOR DETERMINING FRACTURE ATTRIBUTES IN A FORMATION

BACKGROUND

Hydrocarbon fluids such as oil and natural gas are obtained from a subterranean geologic formation by drilling a well that penetrates the hydrocarbon-bearing formation. In a variety of applications, a fracturing procedure is performed to fracture the formation and to facilitate flow of the hydrocarbon fluids to the well. A number of techniques may be employed to enhance knowledge of the formation and/or fracture network induced in the formation. For example, acoustic sources may be used to generate headwaves which travel through the formation and are reflected back to an array of receivers. The data obtained by the array of receivers can be used to evaluate the formation, although existing systems have limitations with respect to determining a variety of fracture attributes.

SUMMARY

In general, a system and methodology are provided for determining fracture attributes from recording and analyzing borehole sonic data before and after a fracturing operation. The technique comprises generating broadband acoustic waves at an array of receivers based on output from a plurality of acoustic sources. The waveforms of the broadband acoustic waves are recorded and processed to estimate sonic signatures. The sonic signatures are then used to determine fracture attributes. In some applications, the data may be used to determine whether the fractures in the formation are filled with fluid or soft sediments. Information on the fracture attributes is output to a suitable system, e.g. a computer display.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 18 is a schematic representation of inverted shear moduli in the presence of an axial fracture, according to an embodiment of the disclosure;

FIG. 19 is an illustration charting techniques for identifying certain fracture attributes, according to an embodiment of the disclosure;

FIG. 29 is a graphical example of dipole flexural dispersions in the absence and presence of fractures contrasted with reconstructed dispersion using inverted transversely-isotropic (TI) elastic constants to confirm the accuracy of an inversion algorithm, according to an embodiment of the disclosure;

FIG. 30 is a schematic illustration of a plurality of cross-sectional fractures filled with soft sediment, according to an embodiment of the disclosure;

FIG. 31 is an illustration charting techniques to identify certain cross-sectional fracture attributes from analyses of monopole and dipole waveforms, according to an embodiment of the disclosure;

DETAILED DESCRIPTION

Figure 1:
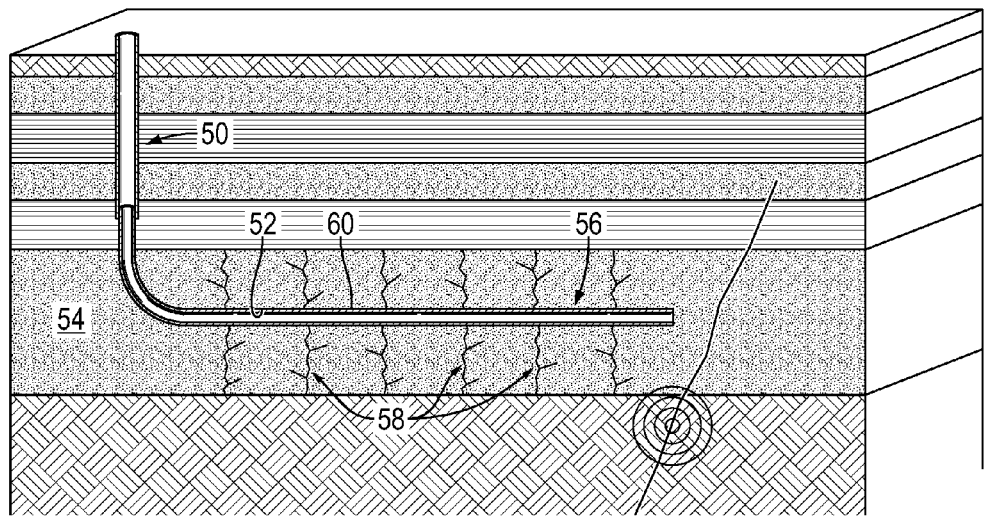
FIG. 1 is a schematic illustration of a well having a wellbore trajectory through a subterranean formation, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a methodology and system for determining fracture attributes from recording and analyzing borehole sonic data before and after a fracturing operation. The technique comprises generating broadband acoustic waves at an array of receivers based on output from a plurality of acoustic sources. The waveforms of the broadband acoustic waves are recorded and processed to estimate sonic signatures and ultimately to determine fracture attributes. The data may be used to determine a variety of fracture attributes, such as whether the fractures are filled with fluid, e.g. mud, or soft sediments. Information on the fracture attributes may be output to an operator via, for example, a computer display or other suitable system.

An acoustic source in a fluid-filled borehole generates headwaves as well as relatively stronger borehole-guided modes. A sonic measurement system may have a piezoelectric source and an array of hydrophone receivers inside a fluid-filled borehole. The piezoelectric source is configured in the form of either a monopole or a dipole source. The source bandwidth typically ranges from about 0.5 to about 20 kHz.

A monopole source generates primarily the lowest-order axisymmetric mode, also referred to as the Stoneley mode, together with headwaves, e.g. compressional and shear headwaves. In contrast, a dipole source primarily excites the lowest-order flexural borehole mode together with compressional and shear headwaves.

The headwaves are caused by the coupling of the transmitted acoustic energy to plane waves in the formation that propagate along the borehole axis. An incident compressional wave in the borehole fluid produces critically refracted compressional waves in the formation. Those refracted along the borehole surface are known as compressional headwaves. The critical incidence angle is provided by the formula $\theta_i = \sin^{-1}(V_f/V_c)$, where $V_f$ is the compressional wave speed in the borehole fluid; and $V_c$ is the compressional wave speed in the formation.

As the compressional headwave travels along the interface, it radiates energy back into the fluid that can be detected by hydrophone receivers placed in the fluid-filled borehole. In fast formations, the shear headwave can be similarly excited by a compressional wave at the critical incidence angle $\theta_i = \sin^{-1}(V_f/V_s)$, where $V_s$ is the shear wave speed in the formation.

It is also worth noting that headwaves are excited when the wavelength of the incident wave is smaller than the borehole diameter so that the boundary can be effectively treated as a planar interface. In a homogeneous and isotropic model of fast formations, as above noted, compressional and shear headwaves can be generated by a monopole source placed in a fluid-filled borehole for determining the formation compressional and shear wave speeds. It is known that refracted shear headwaves cannot be detected in slow formations (where the shear wave velocity is less than the borehole-fluid compressional velocity) with receivers placed in the borehole fluid. In slow formations, formation shear velocities are obtained from the low-frequency asymptote of flexural dispersion. There are processing techniques for the estimation of formation shear velocities in either fast or slow formations from an array of recorded dipole waveforms.

Low-frequency asymptotes of borehole flexural dispersions coincide with the far-field formation shear velocities (or slownesses). The fast-shear and slow-shear velocities can be readily converted into shear moduli as described by the following equations:

$$C_{44} = \rho V_{SS}^2,$$

$$C_{55} = \rho V_{FS}^2,$$

where $\rho$ is the formation mass density; $V_{SS}$ and $V_{FS}$ are the slow and fast shear velocities, respectively, obtained from the processing of cross-dipole data. It should be noted that low-frequency asymptotes of flexural dispersions are largely independent of the presence of casing and possible sonic tool effects on dipole data and also are insensitive to mud compressional slowness (DTmud). Radial depth of investigation of dipole flexural data as a function of frequency helps in confirming that the estimated shear moduli $C_{44}$ and $C_{55}$ are far-field parameters outside near-wellbore alteration caused by the cement annulus.

Natural or hydraulically induced fractures intersecting a producer well contribute to the production of hydrocarbons from unconventional resources, such as tight sand, shalegas, and shale-oil formations. The estimation of fracture orientation, height, and length together with an identification of whether these fractures are open or closed provide important inputs to an optimal completion design for higher productivity. Embodiments described herein provide techniques for the estimation of the three shear moduli and a compressional modulus along the wellbore axis in the presence of either axial or cross-sectional fractures intersecting a fluid-filled borehole. While the two shear moduli ($C_{44}$ and $C_{55}$) in the two orthogonal axial planes can be reliably estimated from the cross-dipole waveforms, the third shear modulus $C_{66}$ in the borehole cross-sectional plane can be estimated either from the monopole Stoneley waveforms or from inversion of bandlimited cross-dipole dispersions. Because the sensitivity of Stoneley waveforms to small changes in the shear modulus $C_{66}$ is rather small, an inversion algorithm can reliably estimate changes in the shear modulus $C_{66}$ from the measured cross-dipole dispersions over a limited bandwidth. Changes in the three shear moduli and a compressional modulus can be used to calculate differences between the normal and tangential compliances of a fractured formation that provide an indicator of whether these fractures are open or closed.

According to an embodiment, a technique is provided for the estimation of changes in the three shear moduli (two in the borehole axial planes; and one in the borehole cross-sectional plane) and the compressional modulus (along the borehole axis) of the fractured rock. Because the sensitivity of monopole Stoneley waveforms is rather small to changes in the cross-sectional shear modulus $C_{66}$, the embodiment provides a workflow to estimate both the axial $C_{44}$ and cross-sectional $C_{66}$ moduli from the inversion of bandlimited dipole flexural dispersion. Changes in the compressional and shear moduli caused by the introduction of fractures are related to the normal and tangential compliances of the fractured rock. Relative changes in the normal and tangential compliances also can help to detect closed versus open fractures that contribute to the production of hydrocarbons from unconventional resources, such as tight sand, shale oil, and shale gas formations.

When a borehole is aligned with one of the principal tectonic stress directions, hydraulic fractures also are generally aligned with the principal stress directions. Such fractures might be parallel to either the borehole axial or cross-sectional plane. The introduction of such fractures relaxes stress distributions and changes formation compliances (defined as inverse of stiffnesses) in a characteristic way that can be described in terms of changes in the effective elastic constants of the propagating medium. The presence of borehole cross-sectional fractures of length exceeding the radial depth of investigation of the sonic tool in an isotropic formation introduces an effective TIV (Transverse-Isotropy with vertical TI-symmetry axis) anisotropy with the symmetry axis parallel to the borehole axis. Formation TIV anisotropy is characterized by the absence of differences in the cross-dipole shear slownesses.

In contrast, the presence of borehole axial fractures of a length exceeding the radial depth of investigation of the sonic tool effectively introduces a TIH (Transverse-Isotropy with horizontal TI-symmetry axis) anisotropy with the symmetry axis perpendicular to the borehole axis. Under these circumstances, dipole shear slownesses are different with dipole transmitter parallel and perpendicular to the fracture plane. The presence of a single axial fracture of, for example, thickness 5 mm and infinite length intersecting a fluid-filled borehole of, for example, diameter 20 cm exhibits substantial differences between the fast and slow dipole shear slownesses at low frequencies and the two dipole dispersions appear to merge at high frequencies. The new multi-frequency inversion of cross-dipole dispersions yields estimates of both the shear moduli $C_{44}$ and $C_{55}$ in the two orthogonal axial planes as well as the shear modulus $C_{66}$ in the borehole cross-sectional plane. Inversion of dipole dispersions provide estimates of $C_{44}$ and $C_{66}$ in the two opposite quadrants from the fast dipole dispersion; and $C_{55}$ and $C_{66}$ in the other two quadrants from the slow dipole dispersion. In either of these two cases, we see that $C_{66} > C_{44}$ and $C_{55}$.

These observations are consistent with the estimate of azimuthally averaged $C_{66}$ obtained from the inversion of Stoneley dispersion in the presence of an axial fracture. The estimated $C_{66}$ from the Stoneley dispersion is also somewhat larger than its value in the absence of any fractures. Azimuthal and radial heterogeneities in the three shear moduli $C_{66}$, $C_{44}$, and $C_{55}$ cause the Stoneley dispersion to somewhat vary at different frequencies from the computed Stoneley dispersion for an azimuthally and radially homogeneous formation.

The presence of cross-sectional fractures reduces the magnitude of $C_{66}$. Cross-sectional fractures also cause the Stoneley and dipole dispersions to be slower than the unfractured formation.

Fracture-induced transversely-isotropic (TI-) anisotropy can be understood from the following: when fractures are either parallel to the borehole axial or cross-sectional plane, the surrounding formation behaves like a TI-formation. Fractures parallel to the borehole axial plane cause the surrounding formation to exhibit TIH, whereas fractures parallel to the borehole cross-sectional plane introduces TIV anisotropy in the surrounding formation.

A TI-formation may be characterized by the anisotropic elastic stiffness tensor $C_{ij}$ described by the following elements:

$$C_{ij} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix} \quad (1)$$

where the following elastic stiffnesses can be estimated from compressional and dipole shear velocities measured from a sonic tool in a fluid-filled borehole parallel to the $X_3$-axis in the presence of TIH formation anisotropy:

$$C_{33} = \rho_b V_p^2 \quad (2)$$

$$C_{44} = \rho_b V_{slow\text{-}shear}^2 \quad (3)$$

$$C_{55} = \rho_b V_{fast\text{-}shear}^2 \quad (4)$$

and where $\rho_b$ is the formation bulk density; $V_p$ is the compressional velocity along the borehole axis; $V_{slow\text{-}shear}$ is the slow dipole shear velocity; and $V_{fast\text{-}shear}$ is the fast dipole shear velocity. In contrast, when fractures are parallel to the borehole cross-sectional plane and the formation exhibits TIV anisotropy, the two dipole shear velocities are the same and $C_{44} = C_{55}$.

To estimate both the normal and tangential compliances (inverse of stiffnesses) of the fractured rock, an estimate is made of the shear modulus $C_{66}$ in the borehole cross-sectional plane in the presence of aligned fractures. Currently, we estimate $C_{66}$ from the monopole Stoneley waveforms. However, this estimation may be strongly affected by the tool presence and near-wellbore alteration and may be further affected by somewhat reduced sensitivity of the Stoneley dispersion to changes in the shear modulus $C_{66}$.

Embodiments of the present technique involve estimating the shear modulus $C_{66}$ using the dispersive part of the dipole flexural dispersion. Fractional changes in the phase velocity of the borehole flexural dispersion caused by changes from a chosen reference state in the elastic constants and mass density of the formation surrounding a fluid-filled borehole can be expressed in terms of the following volume integral at a given wavenumber (Sinha, 1997):

$$\frac{\Delta V_k}{V_k^m} = \frac{\Delta \omega_k}{\omega_k^m} = \frac{\int_V \Delta C_{impq} u_{i,n}^m u_{q,l}^m dV}{2(\omega_k^m)^2 \int_V \rho_0 u_q^m u_q^m dV} - \frac{\int_V \Delta \rho u_q^m u_q^m dV}{2 \int_V \rho_0 u_q^m u_q^m dV}, \quad (5)$$

where $\Delta V_k/V_k^m$ and $\Delta \omega_k/\omega_k^m$, respectively, represent fractional changes in the phase velocity and angular frequency at a given wavenumber k; and $\Delta C_{Impq}$ and $\Delta \rho$, respectively, denote differences in the elastic constants and mass density of the surrounding formation from those assumed in the effective isotropic reference state.

The effective isotropic reference state can be described by the two Lame constants $\lambda$ and $\mu$; and mass density $\rho_o$. The eigensolution for a chosen borehole mode m is denoted by the displacement $u_q^m$; and $V_k^m$ and $\omega_k^m$ are the phase velocity and angular frequency at a given wavenumber k. In this description, Cartesian tensor notation has been used for the elastic constants, a convention in which a comma followed by an index q implies partial derivative with respect to $x_q$, and a summation convention is used for repeated indices. The Cartesian tensor indices l, m, p, and q take values 1, 2, and 3.

At a given wavenumber, the integral equation reference above can be simplified and fractional changes can be expressed in the flexural velocities from an equivalent isotropic reference dispersion in terms of differences between the anisotropic state of formation and chosen isotropic elastic constants in the reference state:

$$\frac{\Delta V}{V} = S_{11}\Delta C_{11} + S_{33}\Delta C_{33} + S_{44}\Delta C_{44} + S_{66}\Delta C_{66} + S_{13}\Delta C_{13}, \quad (6)$$

$$S_{pq}(k_i) = \frac{\int_V E_p^m E_q^m dV}{2(\omega_{ki}^m)^2 \int_V \rho_0 u_j^m u_j^m dV} = \frac{\Delta V}{V \Delta C_{pq}}, \quad (7)$$

where $S_{pq}(k_i)$ denote the sensitivity coefficients for the elastic constants $C_{pq}$, the indices p and q denote the compressed Voigt's notation and take on values 1, 2, 3, . . . 6; and the strain $E_p^m$ is defined by:

$$E_p^m = E_{ij}^m = \frac{1}{2}(u_{i,j}^m + u_{j,i}^m), \quad (8)$$

and $u_j^m$ denotes the displacement associated with the eigensolution of a fluid-filled borehole surrounded by an equivalent isotropic and radially homogeneous formation. Note that $\Delta C_{pq}$ is expressed in terms of the TI-constants $C_{pq}$ as shown above in Equation (1) after integrating the eigensolution azimuthally over $\varphi$. Differences between the TI-elastic constants and chosen effective isotropic constants in the reference state are defined by:

$\Delta C_{11} = C_{11} - (\lambda + 2\mu)$, $\Delta C_{33} = C_{33} - (\lambda + 2\mu)$, $\Delta C_{44} = C_{44} - \mu$, $\Delta C_{66} = C_{66} - \mu$, $\Delta C_{13} = C_{13} - \lambda$. (9)

Normalized sensitivity coefficients take the form:

$$S_{pq}^n = \frac{\Delta V}{V}\left(\frac{C_{pq}^{ref}}{\Delta C_{pq}}\right),$$

Therefore, the actual velocity at a given wavenumber is given by:

$$V = V_{ref} + V_{ref}(S_{11}\Delta C_{11} + S_{33}\Delta C_{33} + S_{44}\Delta C_{44} + S_{66}\Delta C_{66} + S_{13}\Delta C_{13}), \quad (10)$$

The corresponding frequency f for the perturbed velocity V can be expressed as:

$$k = \frac{\omega^{ref}}{V^{ref}} = \frac{\omega}{V}, \quad (11)$$

$$f = \frac{kV}{2\pi},$$

Borehole dispersions can be inverted for multiple anisotropic constants. It can be demonstrated that at a given wavenumber $k_i$ or equivalently, frequency $f_i$:

$$\frac{\Delta V_i}{V_i} = S_{11}^i \Delta C_{11} + S_{33}^i \Delta C_{33} + S_{44}^i \Delta C_{44} + S_{66}^i \Delta C_{66} + S_{13}^i \Delta C_{13}, \quad (12)$$

where a minimum of 5 independent velocity-frequency data sets are used to solve for the 5 independent TI-constants and they can be solved for from the following matrix equation:

$$\begin{bmatrix} S_{11}^1 & S_{33}^1 & S_{44}^1 & S_{66}^1 & S_{13}^1 \\ S_{11}^2 & S_{33}^2 & S_{44}^2 & S_{66}^2 & S_{13}^2 \\ S_{11}^3 & S_{33}^3 & S_{44}^3 & S_{66}^3 & S_{13}^3 \\ S_{11}^4 & S_{33}^4 & S_{44}^4 & S_{66}^4 & S_{13}^4 \\ S_{11}^5 & S_{33}^5 & S_{44}^5 & S_{66}^5 & S_{13}^5 \end{bmatrix} \begin{bmatrix} \Delta C_{11} \\ \Delta C_{33} \\ \Delta C_{44} \\ \Delta C_{66} \\ \Delta C_{13} \end{bmatrix} = \begin{bmatrix} \frac{\Delta V_1}{V_1} \\ \frac{\Delta V_2}{V_2} \\ \frac{\Delta V_3}{V_3} \\ \frac{\Delta V_4}{V_4} \\ \frac{\Delta V_5}{V_5} \end{bmatrix}. \quad (13)$$

However, inverting for all five TI-constants from a single modal dispersion can be a formidable task. The sensitivities to some of the TI-constants are too small and this may cause the inversion to be ill-conditioned for a bandlimited dispersion. The magnitude and frequency dependence of sensitivity functions provide useful guidelines to select optimal bandwidths for possible inversion of a single or a few TI-elastic constants. Rewriting the equation (12), we have at a given wavenumber $k_i$ or equivalently, frequency $f_i$:

$$\frac{\Delta V_i}{V_i} = s_{ij}\Delta c_j, \quad (14)$$

where $\Delta c_1 = \Delta C_{11}$, $\Delta c_2 = \Delta C_{33}$, $\Delta c_3 = \Delta C_{44}$, $\Delta c_4 = \Delta C_{66}$, and $\Delta c_5 = \Delta C_{13}$; $s_{ij}$ denotes sensitivity to $\Delta c_j$ at wavenumber $k_i$; and j=1, 2, 3, 4, and 5 corresponds to the 5 independent TI-constants. Assuming that there are i measured fractional velocity changes $\Delta V_i/V_i$ from a chosen reference state, a desirable estimate of TI-elastic constants without any constraints for a Gaussian random process is given by:

$$\Delta c_j = \frac{s_{ji}}{(s_{ji}s_{ij})}\frac{\Delta V_i}{V_i}. \quad (15)$$

Assuming the sensitivity to $C_{66}$ is significantly larger than other elastic constants over a select bandwidth:

$$\Delta c_4 = \Delta C_{66} = \frac{\sum_{i=1}^{n} s_{4i}\frac{\Delta V_i}{V_i}}{\sum_{i=1}^{n}(s_{4i})^2}, \quad (16)$$

where the index n denotes number of velocity-frequency data used in the inversion, and the inverted $C_{66}$ is then given by:

$$C_{66} = \lambda + \Delta C_{66}. \quad (17)$$

The equation (10) referenced above for actual velocity at a given wave number can now be updated as follows:

$$\frac{\Delta V_i}{V_i} - s_{i4}\Delta c_4 = \frac{\Delta W_i}{W_i} = s_{i1}\Delta c_1 + s_{i2}\Delta c_2 + s_{i3}\Delta c_3 + s_{i5}\Delta c_5, \quad (18)$$

Next we invert for another shear modulus $C_{44}$ after updating the input fractional velocity at a given wavenumber by $\Delta W_i/W_i$:

$$\Delta c_3 = \Delta C_{44} = \frac{\sum_{i=1}^{n} s_{3i}\frac{\Delta W_i}{W_i}}{\sum_{i=1}^{n}(s_{3i})^2}, \quad (19)$$

and the inverted $C_{44}$ is then given by:

$$C_{44} = \mu + \Delta C_{44}. \quad (20)$$

Equation (18) is then updated as:

$$\frac{\Delta V_i}{V_i} - s_{i4}\Delta c_4 - s_{i3}\Delta c_3 = \frac{\Delta X_i}{X_i} = s_{i1}\Delta c_1 + s_{i2}\Delta c_2 + s_{i5}\Delta c_5, \quad (21)$$

and inverted for another shear modulus $C_{13}$ after updating the input fractional velocity at a given wavenumber by $\Delta X_i/X_i$:

$$\Delta c_5 (= \Delta C_{13}) = \frac{\sum_{i=1}^{n} s_{5i}\frac{\Delta X_i}{X_i}}{\sum_{i=1}^{n}(s_{5i})^2}, \quad (22)$$

and the inverted $C_{13}$ is then given by:

$$C_{13} = \lambda + \Delta C_{13}. \quad (23)$$

Equation (21) is then updated as:

$$\frac{\Delta V_i}{V_i} - s_{i4}\Delta c_4 - s_{i3}\Delta c_3 - s_{i5}\Delta c_5 = \frac{\Delta Y_i}{Y_i} = s_{i1}\Delta c_1 + s_{i2}\Delta c_2, \quad (24)$$

and inverted for another shear modulus $C_{13}$ after updating the input fractional velocity at a given wavenumber by $\Delta Y_i/Y_i$:

$$\Delta c_1 (= \Delta C_{11}) = \frac{\sum_{i=1}^{n} s_{1i}\frac{\Delta Y_i}{Y_i}}{\sum_{i=1}^{n}(s_{1i})^2}, \quad (25)$$

and the inverted $C_{11}$ is then given by:

$$C_{11} = \lambda + 2\mu + \Delta C_{11}.$$

Equation (24) is then updated as:

$$\frac{\Delta V_i}{V_i} - s_{i4}\Delta c_4 - s_{i3}\Delta c_3 - s_{i5}\Delta c_5 - s_{i1}\Delta c_1 = \frac{\Delta Z_i}{Z_i} = s_{i2}\Delta c_2, \quad (26)$$

and inverted for another shear modulus $C_{33}$ after updating the input fractional velocity at a given wavenumber by $\Delta Z_i/Z_i$:

$$\Delta c_2 (= \Delta C_{33}) = \frac{\sum_{i=1}^{n} s_{2i}\frac{\Delta Z_i}{Z_i}}{\sum_{i=1}^{n}(s_{2i})^2}, \quad (27)$$

and the inverted $C_{33}$ is then given by:

$$C_{33} = \lambda + 2\mu + \Delta C_{33}.$$

Accordingly, the 5 TI-elastic constants can be inverted provided there are adequate sensitivities to all of them over select bandwidths. This iterative inversion of elastic constants can be continued until sensitivities of the remaining constants are deemed to be too small for a reliable inversion. The iterative process of estimating multiple TI elastic constants with progressively reduced sensitivities is terminated when differences between the predicted and measured dipole dispersions become negligibly small.

Embodiments described herein provide a procedure for estimating multiple TI-constants in a fractured formation. The procedure may comprise the following: use a low-frequency dipole shear slowness together with the compressional slowness to construct an equivalent-isotropic reference dipole dispersion; calculate frequency-dependent sensitivities of the dipole flexural dispersion to the five TI-elastic constants in the chosen reference state using a new volumetric integral equation; invert differences between this reference and measured dipole dispersions over a chosen bandwidth for a sequence of TI-elastic constants with progressively decreasing sensitivities; and terminate the iterative inversion process when the successive differences between the predicted and measured dipole dispersions together with sensitivities of remaining elastic constants become negligibly small.

Referring generally to the Figures, various illustrations are provided to facilitate an understanding of processes and systems that may be utilized in carrying out the procedure for determining fracture attributes of fractures formed in a subterranean formation. In FIG. 1, for example, a schematic diagram is provided of a well 50 having a wellbore 52 extending into a subterranean formation 54. Wellbore 52 has a trajectory through, for example, an aquifer, an impermeable layer, and into a hydrocarbon-bearing, e.g. gas-bearing, formation. In this example, a horizontal section 56 of wellbore 52 is hydraulically fractured to create a plurality of fractures 58 extending into formation 54 to facilitate flow of hydrocarbons into the wellbore 52. In many production and observation wells, the wellbore 52 is cased with a casing 60 although the wellbore may be an open wellbore or have open sections of wellbore.

Sonic data may be acquired at an array of receivers, and that sonic data may be substantially affected by the quality of bonds between steel casing and a cement annulus as well as between the cement annulus and formation 54. Processing and interpretation of sonic data from cased holes can be more challenging than in open holes because of interference from the casing arrivals and reduced sensitivity of sonic velocities to changes in formation properties. Compressional headwave processing involves removal of the casing arrival that might be close to the formation compressional that could cause mislabeling of the two compressional slownesses. The far-field shear slownesses may be obtained from the measured Stoneley and cross-dipole dispersions that are significantly affected by the presence of casing and cement annulus. The same measurements in cased holes encounter additional challenges because of the presence of a steel casing bonded to the cement annulus. For example, steel casing in the form of a thick steel pipe is a strong waveguide and its associated modes interact with the formation modes. Consequently, acquiring sonic data in cased holes involves removal of the casing arrival from the compressional headwave processing. In addition, inversion of the Stoneley and dipole dispersions involves accounting for the presence of steel casing and near-wellbore alteration caused by the cement annulus and possible mechanical damage to the formation.

Figure 2:
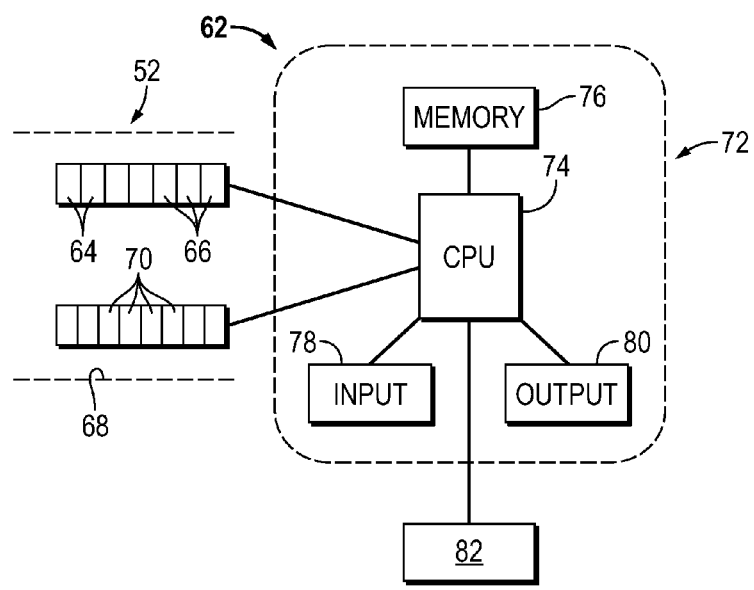
FIG. 2 is a schematic illustration of a data acquisition and processing system that may be used to determine fracture attributes, according to an embodiment of the disclosure.

Referring generally to FIG. 2, a schematic example of a data collection and processing system 62 is illustrated. In this example, a plurality of acoustic sources, e.g. monopole sources 64 and dipole sources 66, is placed in a fluid filled borehole 68 of wellbore 52. Additionally, an array of receivers 70 also is placed in wellbore 52. Depending on the application, some of the acoustic sources 64, 66 and/or some of the receivers 70 may be placed at locations outside of the wellbore 52. The data collection and processing system 62 may be used to estimate fracture-induced changes in the effective shear moduli and compressional modulus of the fractured rock information 52 due to fractures 58.

As further illustrated in FIG. 2, the acoustic sources 64, 66 and the array of receivers 70 may be coupled with a control/processing system 72. In this example, processing system 72 may comprise a processor 74 in the form of a central processing unit (CPU), e.g. a microprocessor. The processor 74 is operatively employed to intake and process data obtained from sources 64, 66 and the array of receivers 70. The processor 74 may be operatively coupled with a memory 76, an input device 78, and an output device 80. Memory 76 may be used to store many types of data, such as data collected and updated via the array of receivers 70. Input device 78 may comprise a variety of devices, such as a keyboard, mouse, voice recognition unit, touchscreen, other input devices, or combinations of such devices. Output device 80 may comprise a visual and/or audio output device, such as a computer display, monitor, or other display medium having a graphical user interface. Additionally, the processing may be done on a single device or multiple devices locally, at a remote location, or with some local devices and other devices located remotely, e.g. a server/client system.

The processor system 72 is able to work with selected algorithms, programs, and/or models for processing data obtained from receivers 70. The processor system 72 also may function as a control system for controlling actuation of acoustic sources 64, 66. Depending on the application, the algorithms, programs, and/or models for processing collected data and/or for controlling the acoustic sources may be contained in a variety of software modules 82 which may be downloaded to system 72.

According to an example of a workflow for estimating fracture-induced changes in the effective shear moduli and compressional modulus of the fractured rock, synthetic waveforms are generated using monopole sources 64 and dipole sources 66 which are placed in the fluid-filled borehole 68. The synthetic waveforms are generated before and after introducing a long axial fracture having a thickness of, for example, 5 mm. In this example, the material parameters of the formation can be summarized as follows:
Formation compressional velocity (m/s): 3277.42; formation shear velocity (m/s): 2045.64; formation mass density (g/cc): 2.5.
Borehole fluid compressional velocity (m/s): 1500.0; borehole shear velocity (m/s): 0.0; formation mass density (g/cc): 1.0.

Figure 3:
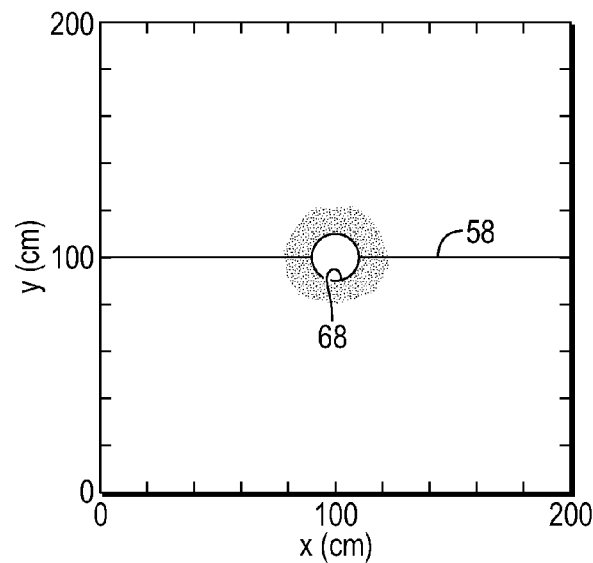
FIG. 3 is a schematic illustration of an axial fracture intersecting a borehole, according to an embodiment of the disclosure.
Figure 4:
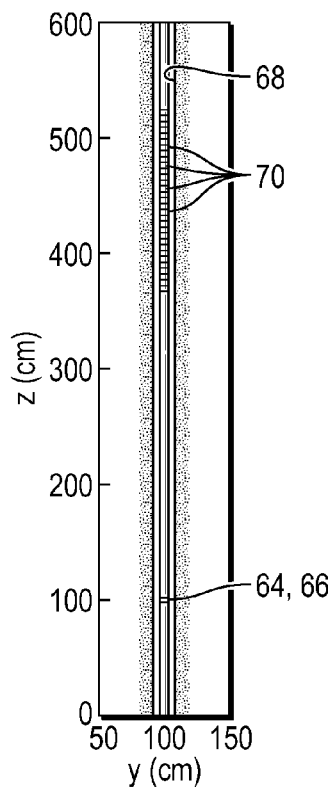
FIG. 4 is a schematic illustration of a subplot displaying a computational geometry of receivers placed relative to a source, according to an embodiment of the disclosure.
Figure 5:
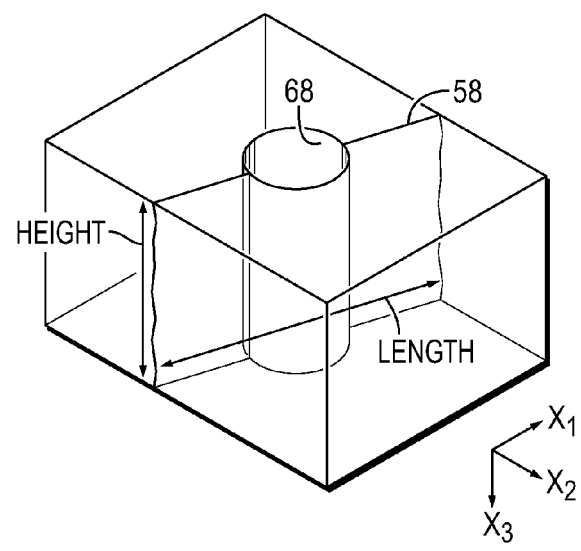
FIG. 5 is a schematic illustration showing the height and length of an axial fracture, according to an embodiment of the disclosure.

With additional reference to FIG. 3, a graphical plot is provided to show a cross-sectional view of a 10 cm radius borehole 68 in the presence of a long, axial fracture of thickness 5 mm. For purposes of this example, FIG. 4 illustrates a ring monopole or dipole source 64/66 and an array of 51 hydrophone receivers 70 arranged with a transmitter-to-receiver spacing of 268 cm and an inter-receiver spacing of 3 cm. FIG. 5 provides a schematic diagram of an axial fracture 58 illustrating fracture height and length. It should be noted that axial fractures extending beyond the radial depth of investigation of the borehole Stoneley and flexural modes may be considered to have infinite length. It should also be noted that this example is provided for purposes of explanation and the actual number, arrangement and spacing of sources and receivers may vary for different applications.

Figure 6:
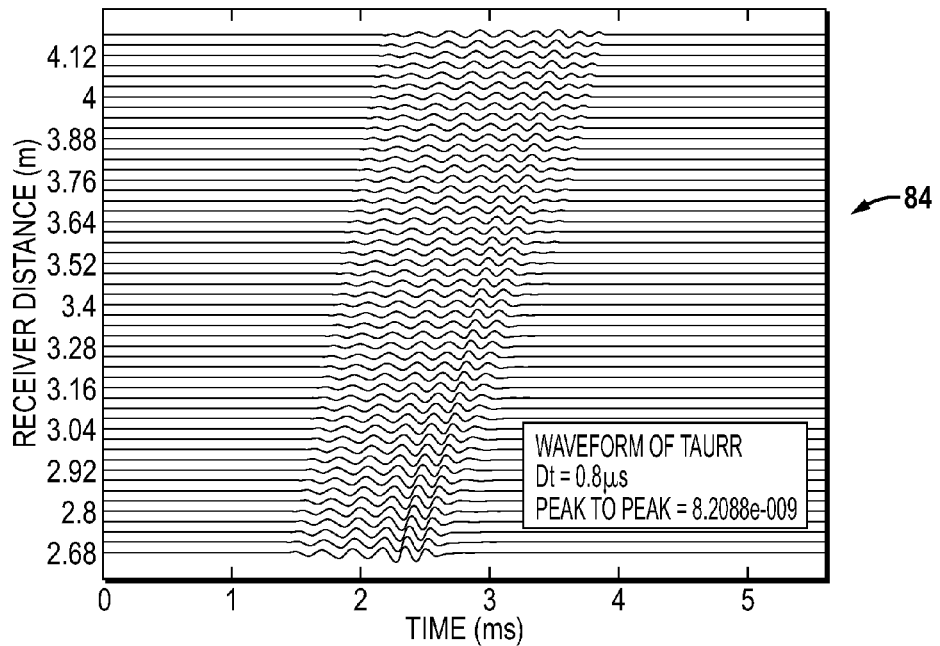
FIG. 6 is a graphical example of synthetic waveforms generated by a dipole source parallel to a fracture plane, according to an embodiment of the disclosure.
Figure 7:
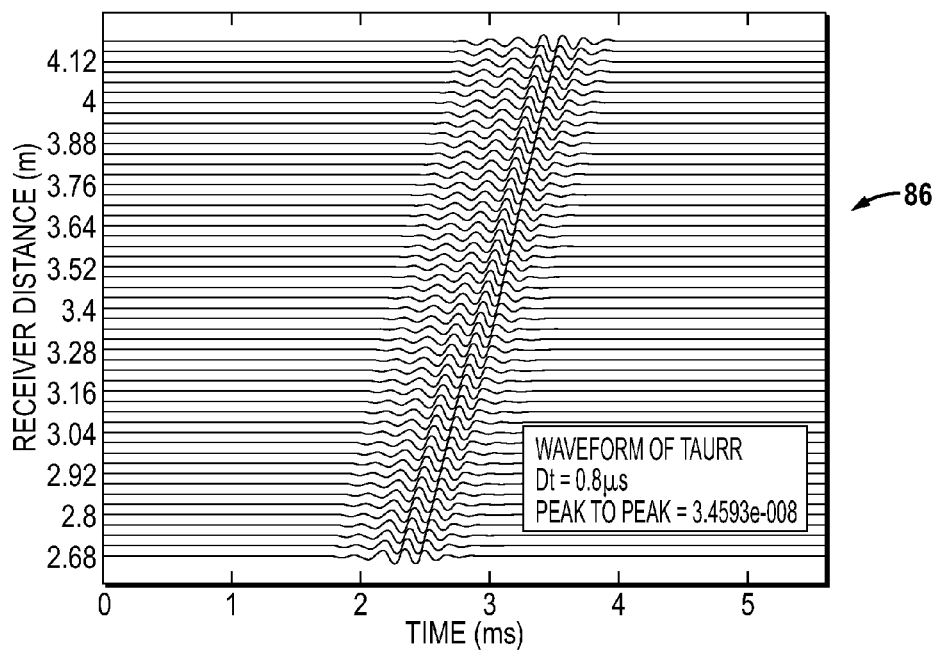
FIG. 7 is a graphical example of synthetic waveforms generated by a dipole source perpendicular to a fracture plane, according to an embodiment of the disclosure.
Figure 8:
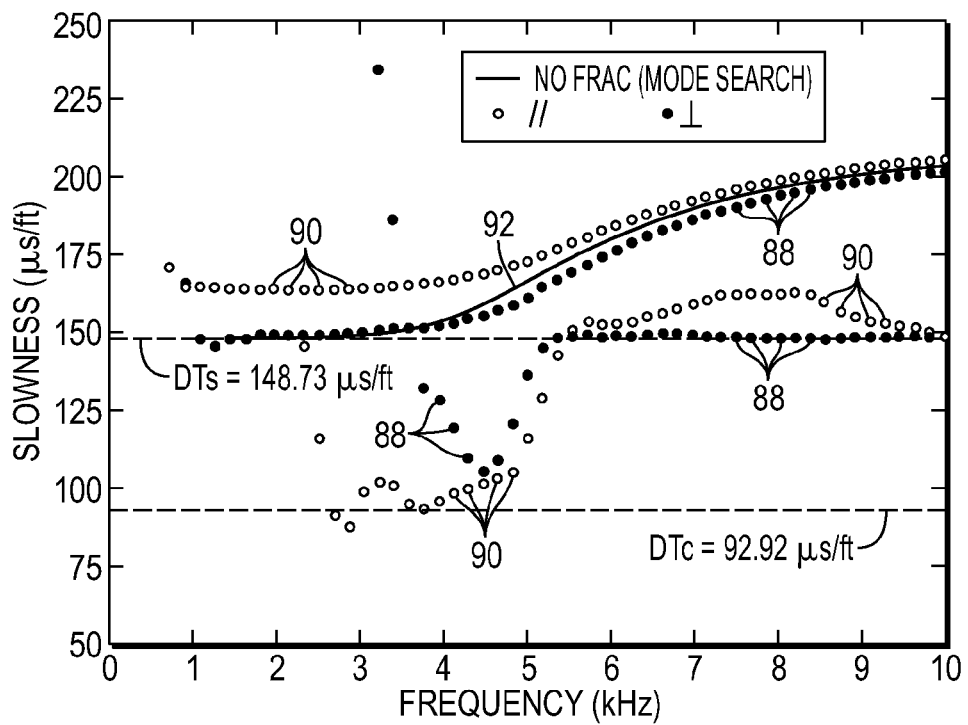
FIG. 8 is a graphical example of synthetic dipole dispersion obtained from waveforms generated by a dipole source parallel and perpendicular to a fracture plane, according to an embodiment of the disclosure.

Continuing with this example, FIGS. 6 and 7 illustrate an array of synthetic waveforms 84 (FIG. 6) and synthetic waveforms 86 (FIG. 7) generated by a dipole source parallel and perpendicular to the fracture plane, respectively. Recorded waveforms at an array of hydrophone receivers 70 placed in a fluid-filled borehole 68 can be processed by a modified matrix pencil algorithm to isolate both nondispersive and dispersive arrivals in the wavetrain. FIG. 8 illustrates the fast- and slow-dipole dispersions in the presence of an axial fracture together with the dipole flexural dispersion in the absence of any fractures. The dots 88 and dots 90, respectively, denote synthetic dipole dispersion obtained from waveforms generated by a dipole source parallel and perpendicular to the fracture plane. The curved line 92 represents the dipole dispersion in the absence of fractures.

Figure 9:
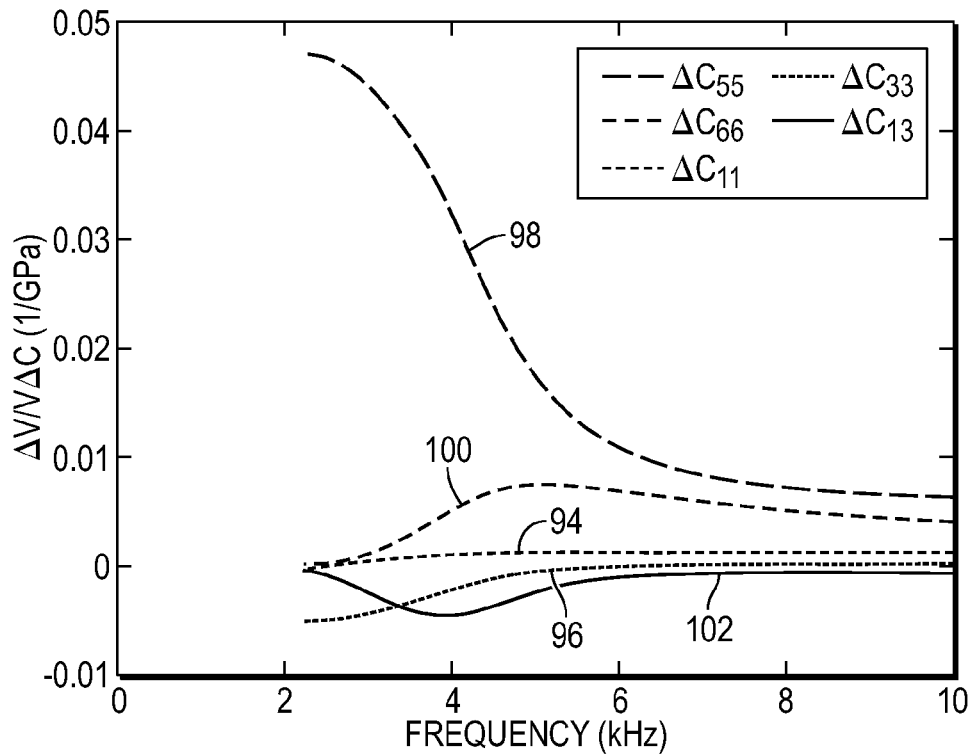
FIG. 9 is a graphical example of fractional changes in a dipole dispersion due to changes in five TI-elastic constants plotted as a function of frequency, according to an embodiment of the disclosure.

FIG. 9 displays sensitivity of the fast-dipole dispersion to small changes in the 5 TI-elastic constants of the surrounding formation. The five curves represent fractional changes in the dipole dispersion caused by 1 GPa change in the five TI-constants plotted as a function of frequency. The five curves comprise a first curve 94 representing $\Delta C_{11}$, a second curve 96 representing $\Delta C_{33}$, a third curve 98 representing $\Delta C_{55}$, a fourth curve 100 representing $\Delta C_{66}$, and a fifth curve 102 representing $\Delta C_{13}$. It should be noted that the dipole dispersion at low frequencies exhibits the largest sensitivity to $C_{55}$. However, the dispersion has substantial sensitivity to $C_{66}$ between 5 to 7 kHz. This characteristic offers an opportunity to estimate $C_{55}$ as well as $C_{66}$ from the inversion of a bandlimited dipole dispersion.

Figure 10:
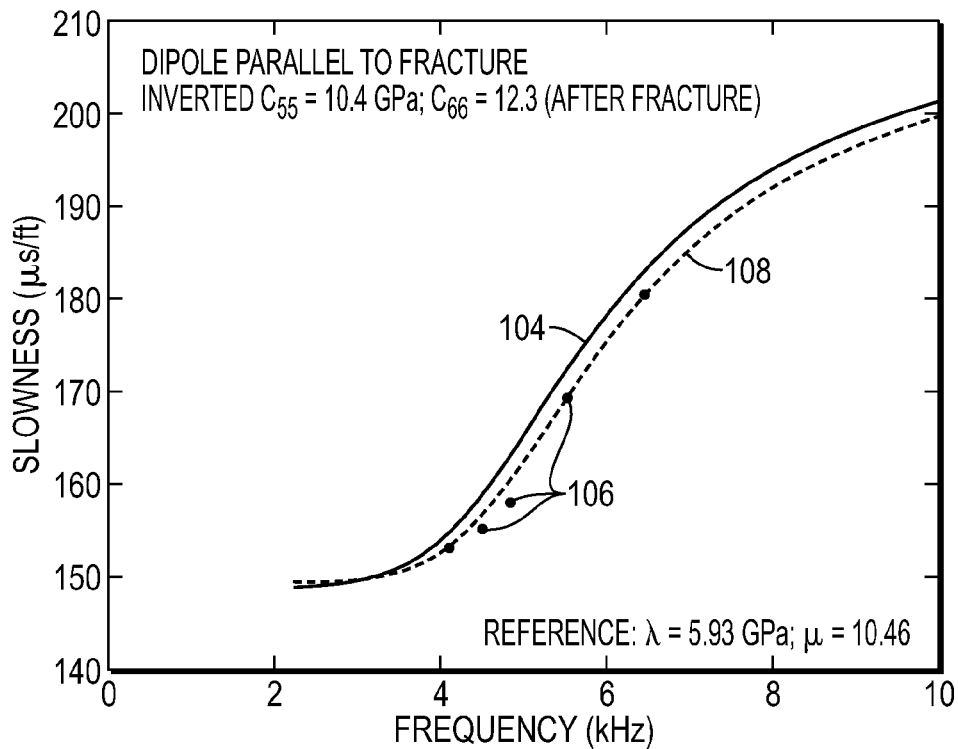
FIG. 10 is a graphical example of dipole flexural dispersion in the absence and presence of an axial fracture, according to an embodiment of the disclosure.

Referring generally to FIG. 10, a graph is provided in which frequency is plotted versus slowness. With respect to the graph, a curved line 104 represents the dipole flexural dispersion in the absence of fractures. The star markers 106 denote the inputs to the inversion algorithm obtained from the (measured) dipole dispersion generated by a dipole source 66 parallel to the fracture plane. Differences between the measured and reference dipole dispersions are inverted to estimate the shear moduli $C_{55}$ and $C_{66}$ in the borehole axial and cross-sectional planes in the fractured formation. The curved line 108 illustrates the predicted dipole dispersion using the inverted shear moduli $C_{55}$ and $C_{66}$. Good agreement between the predicted dipole dispersion and the red star markers confirms the accuracy of the inversion algorithm.

Figure 11:
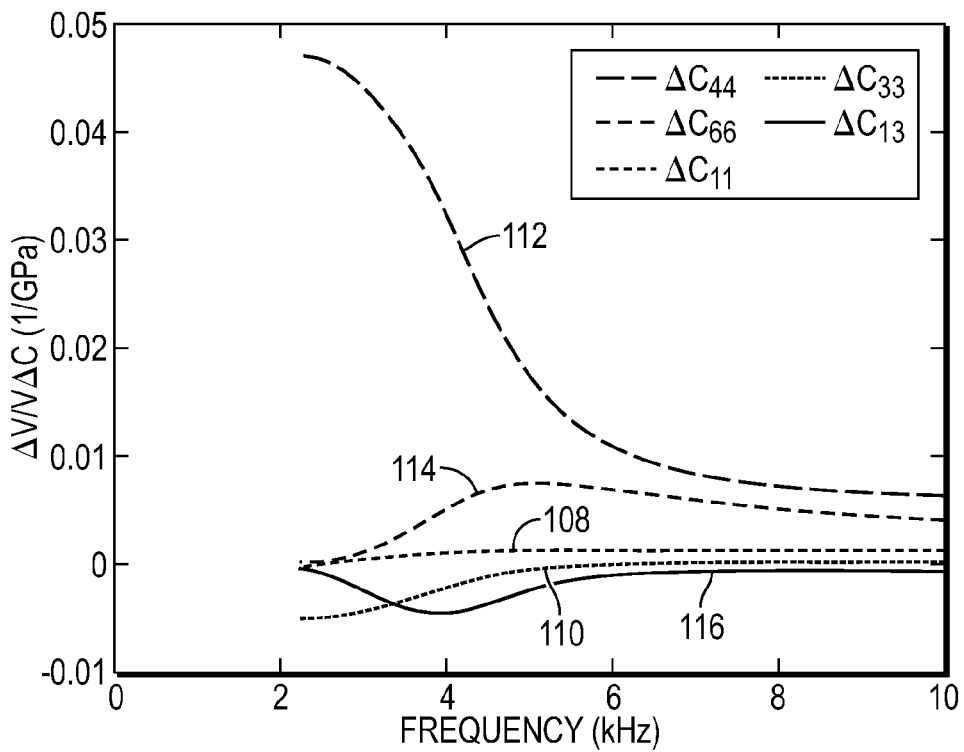
FIG. 11 is a graphical example of fractional changes in the dipole dispersion due to changes in five TI-elastic constants plotted as a function of frequency, according to an embodiment of the disclosure.

Similarly, FIG. 11 displays sensitivity of the slow-dipole dispersion to small changes in the 5 TI-elastic constants of the surrounding formation. The five curves represent fractional changes in the dipole dispersion caused by 1 GPa change in the five TI-constants plotted as a function of frequency. The five curves comprise a first curve 108 representing $\Delta C_{11}$, a second curve 110 representing $\Delta C_{33}$, a third curve 112 representing $\Delta C_{44}$, a fourth curve 114 representing $\Delta C_{66}$, and a fifth curve 116 representing $\Delta C_{13}$. In this particular example, the reference dipole dispersion for both the fast- and slow-dipole orientations is exactly the same.

Figure 12:
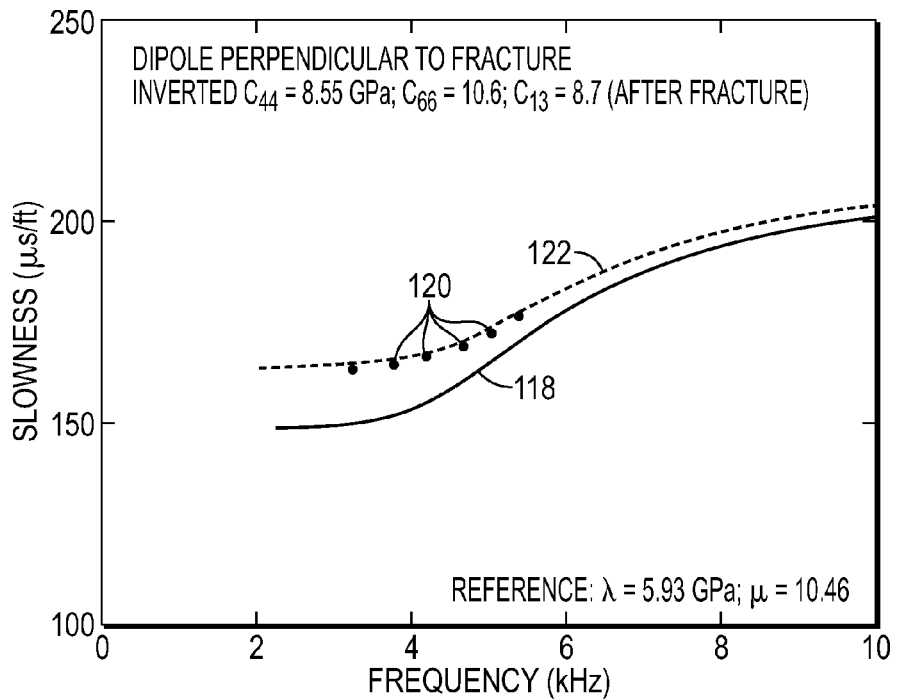
FIG. 12 is a graphical example of dipole flexural dispersion in the absence and presence of an axial fracture, according to an embodiment of the disclosure.

Referring generally to FIG. 12, a graph is provided in which frequency is plotted versus slowness. With respect to the graph, a curved line 118 represents the dipole flexural dispersion in the absence of fractures. The star markers 120 denote inputs to the inversion algorithm obtained from the dipole dispersion generated by a dipole source 66 perpendicular to the fracture plane. Differences between the (measured) and reference dipole dispersions are inverted to estimate the shear moduli $C_{44}$, $C_{66}$ and $C_{13}$ in the fractured formation. The curve 122 illustrates the predicted dipole dispersion using the inverted shear moduli $C_{44}$, $C_{66}$ and $C_{13}$. Good agreement between the predicted dipole dispersion and the red star markers confirms the accuracy of the inversion algorithm.

Figure 13:
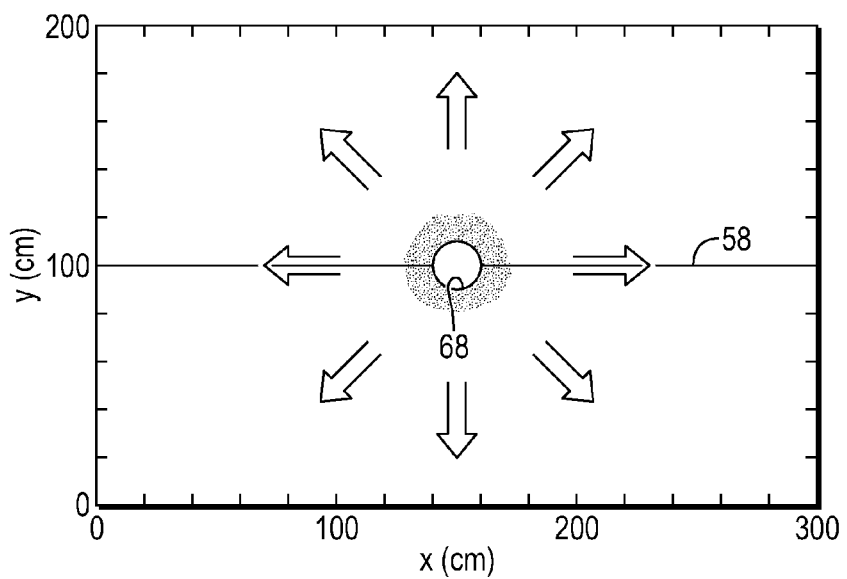
FIG. 13 is a schematic illustration of monopole radiation of an acoustic field in the presence of an axial fracture in a formation with a fluid-filled borehole, according to an embodiment of the disclosure.
Figure 14:
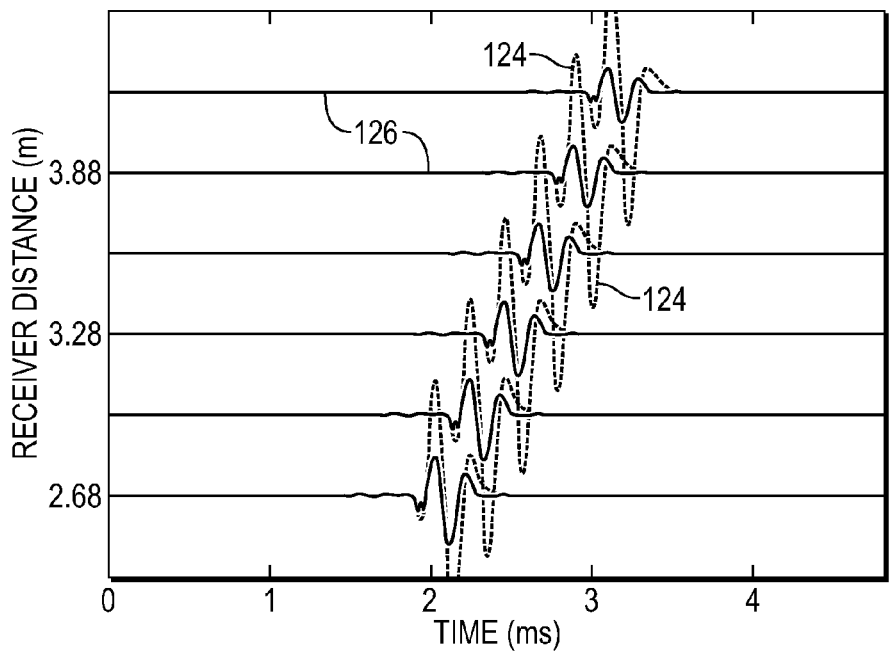
FIG. 14 is a graphical example of synthetic waveforms generated by a monopole source in the absence and presence of an axial fracture, according to an embodiment of the disclosure.

Referring generally to FIG. 13, a schematic diagram is provided to illustrate monopole radiation of an acoustic field in the presence of an axial fracture 58 having a thickness of 5 mm in a formation with fluid-filled borehole 68. With added reference to FIG. 14, a graphical plot is provided showing time versus receiver distance. The dashed curves 124 and the solid curves 126, respectively, denote synthetic waveforms generated by a monopole source 64 in the absence and presence of an axial fracture, respectively. It should be noted that the Stoneley waveform amplitude is significantly reduced in the presence of an axial fracture.

Figure 15:
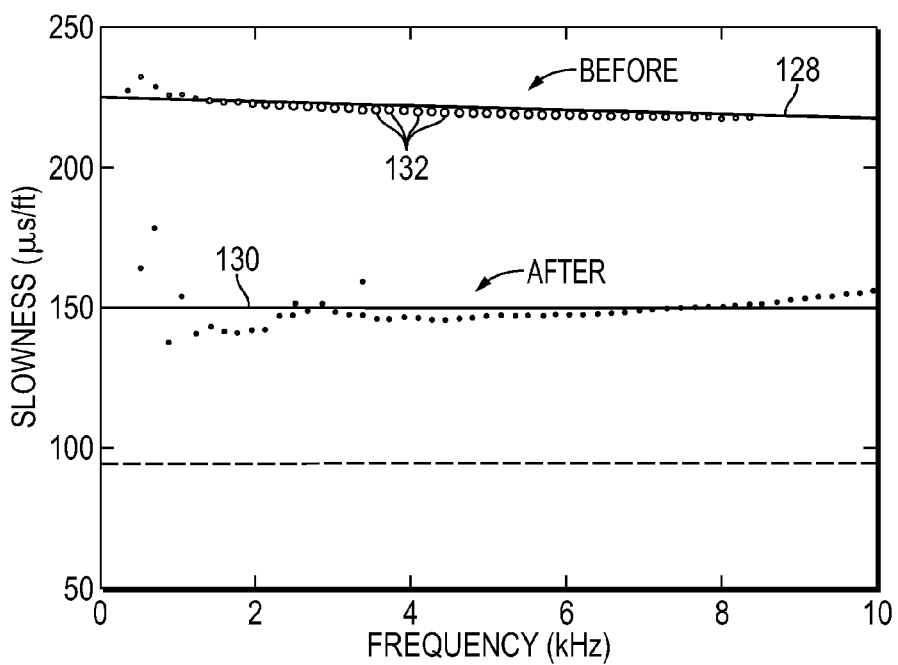
FIG. 15 is a graphical example of the Stoneley dispersion in the absence of fractures and in the presence of an axial fracture, according to an embodiment of the disclosure.

In FIG. 15, a frequency versus slowness graph is provided which compares the Stoneley dispersions before and after introducing an axial fracture in the formation. In this example, an upper solid curve and corresponding circles 128 denote the Stoneley dispersion in the absence of any fractures; and the lower solid curve and corresponding circles 130 denote the dispersion in the presence of an axial fracture of thickness 5 mm. As illustrated, the axial fracture induced changes in the Stoneley dispersion are rather small. The dots 132 denote the presence of pseudo-Rayleigh mode in the recorded waveforms.

Figure 16:
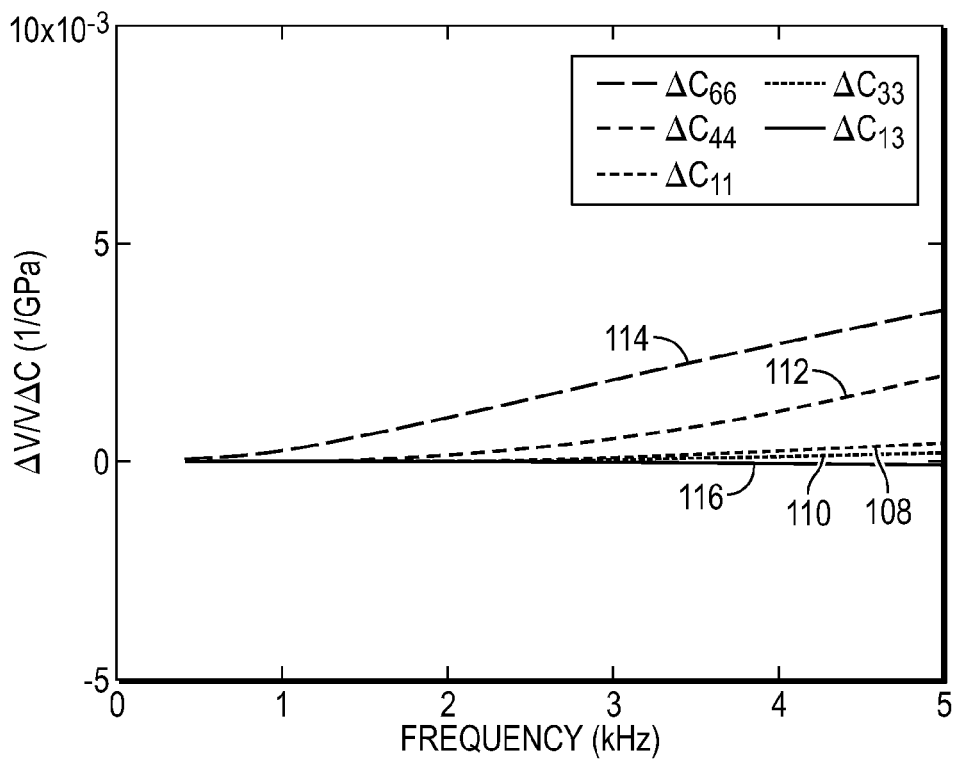
FIG. 16 is a graphical example of fractional changes in the Stoneley dispersion due to changes in the five TI-elastic constants plotted as a function of frequency, according to an embodiment of the disclosure.

Referring generally to FIG. 16, a graphical representation is provided to display fractional changes in the Stoneley dispersion caused by 1 GPa change in the five TI-elastic constants plotted as a function of frequency and represented by graph lines 108, 110, 112, 114 and 116. It should be noted that the Stoneley dispersion in the presence of an axial fracture exhibits negligibly small sensitivity to $C_{11}$, $C_{33}$, and $C_{13}$. However, there are adequate amounts of Stoneley dispersion sensitivity to changes in $C_{66}$ and $C_{44}$. It is then possible to invert differences between the measured and reference Stoneley dispersions for $C_{66}$ and $C_{44}$.

Figure 17:
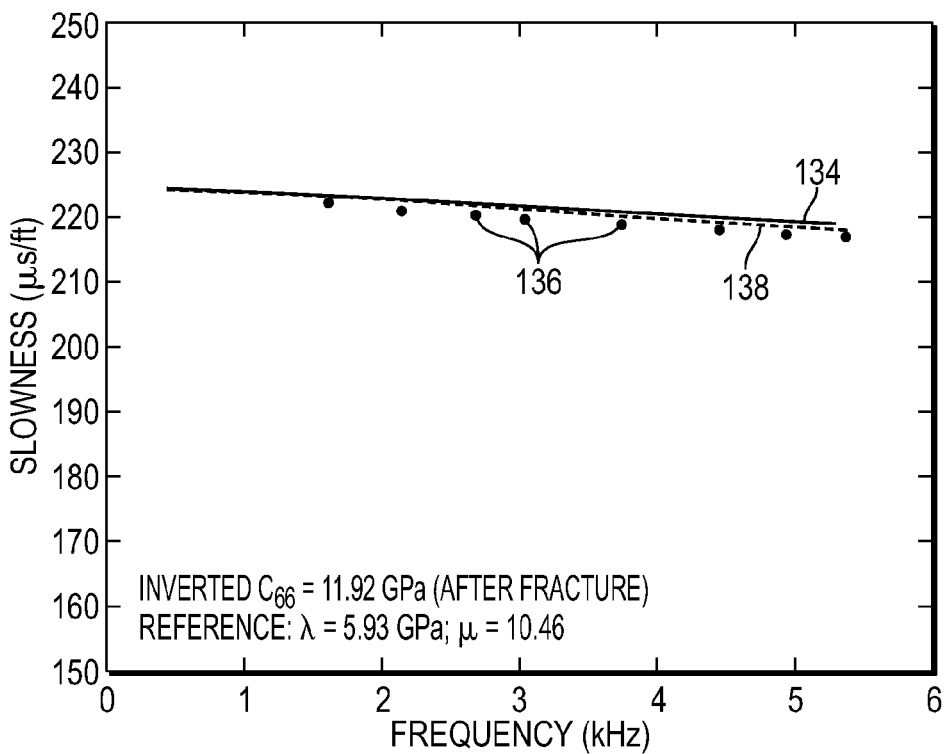
FIG. 17 is a graphical example of monopole Stoneley dispersion in the absence and presence of an axial fracture, according to an embodiment of the disclosure.

In FIG. 17, another graphical representation is provided in which frequency is plotted versus slowness. In this example, a curve 134 represents the monopole Stoneley dispersion in the absence of fractures. The star markers 136 denote the inputs to the inversion algorithm obtained from the (measured) Stoneley dispersion generated by a monopole source 64 in the fractured formation. Differences between the measured and reference dipole dispersions are inverted to estimate the shear modulus $C_{66}$ in the borehole cross-sectional plane in the fractured formation. The curve 138 illustrates the predicted Stoneley dispersion using the inverted shear modulus $C_{66}$. Good agreement between the predicted Stoneley dispersion and the input star markers 136 confirms the accuracy of the inversion algorithm.

Referring generally to FIG. 18, a summary is provided of inverted shear moduli in the presence of an axial fracture 58 of thickness 5 mm. It should be noted that the shear modulus $C_{66}$ obtained from waveforms generated by a dipole source 66 parallel and perpendicular to the axial fractures are 12.3 and 10.6 GPa, respectively. This difference is caused by the azimuthal weighting of the dipole radiation that is more sensitive to effective formation properties in the two opposite quadrants.

FIG. 19 summarizes a plurality of techniques which may be used to help identify certain fracture attributes from analyses of the monopole and dipole waveforms in the presence of axial fractures intersecting a fluid-filled borehole. For example, the fracture strike/plane may be identified via evaluation of a fast shear azimuth, a fast dipole parallel to the fracture plane, and/or a slow dipole perpendicular to the fracture plane. The fracture height may be identified via the axial extent of dipole shear anisotropy. Fracture length may be determined by a variety of techniques. For example, short fractures of less than 1 m may be determined via evaluation of multiple fast flexural modes/reflections and/or larger dipole slownesses at higher frequencies. Long fractures of greater than about 1 m may be determined via TIH anisotopy signatures.

Figure 20:
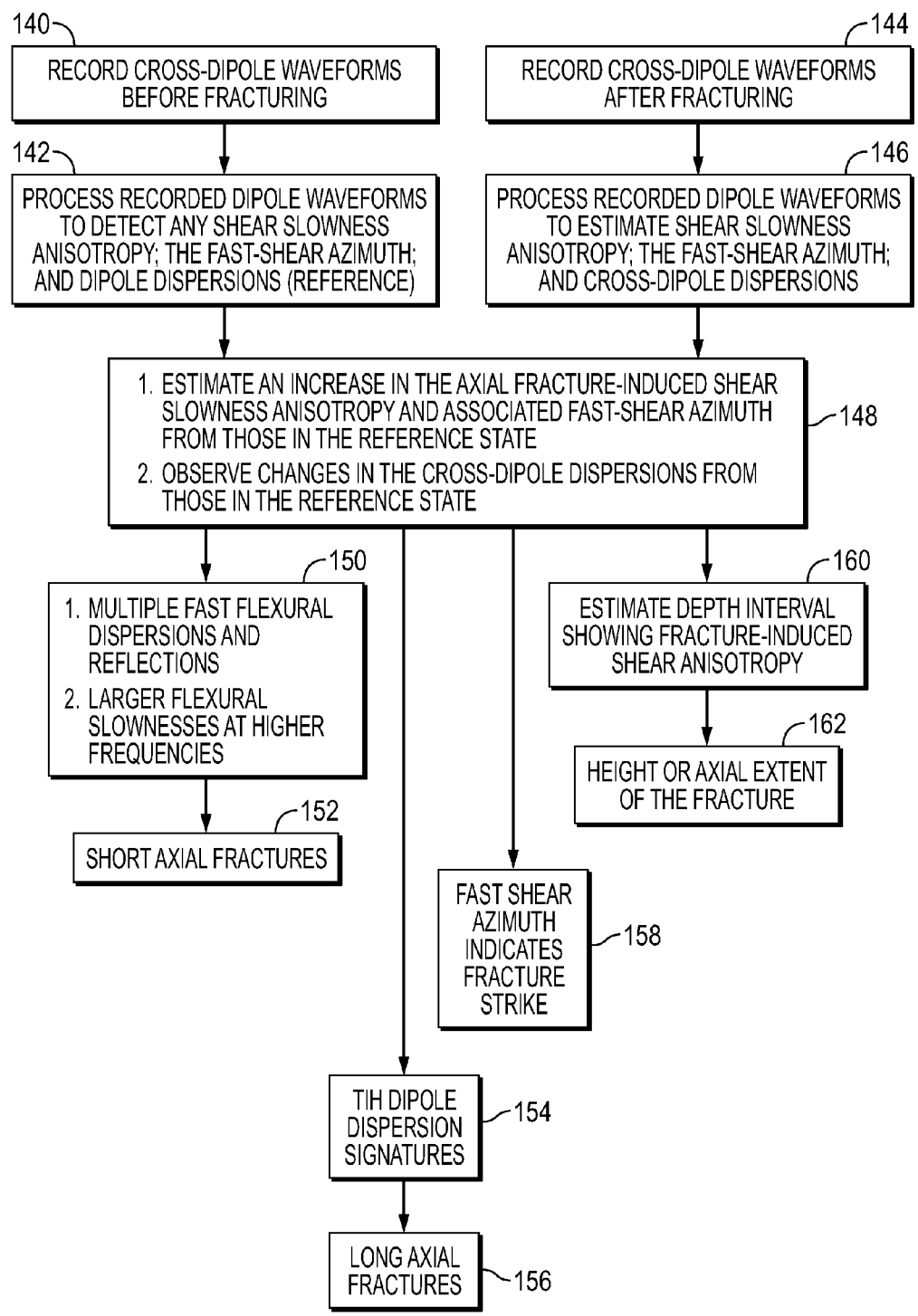
FIG. 20 is a flowchart representing an example of a methodology to identify fracture strike, fracture height, and fracture length of axial fractures, according to an embodiment of the disclosure.

Referring generally to FIG. 20, a flowchart is provided to illustrate a procedure for identifying fracture strike, fracture height, and fracture length of axial fractures 58. In this example, cross-dipole waveforms are recorded before fracturing, as indicated by block 140. By way of example, the waveforms may be recorded in a suitable memory, such as memory 76 of data collection and processing system 62. The recorded dipole waveforms are then processed on, for example, processing system 72 to detect shear slowness anisotropy, fast-shear azimuth, and cross-dipole dispersions and to thus establish reference values, as indicated by block 142.

Cross-dipole waveforms also are recorded, e.g. recorded in memory 76, after fracturing of formation 54, as indicated by block 144. The recorded "after fracturing" dipole waveforms are then processed on, for example, processing system 72 to detect shear slowness anisotropy, fast-shear azimuth, and cross-dipole dispersions, as indicated by block 146. The data from the processed, cross-dipole waveforms after fracturing can then be compared to the reference data from the processed, cross-dipole waveforms established prior to fracturing.

As indicated by block 148, for example, an estimate may be made regarding an increase in the axial fracture-induced shear slowness anisotropy and associated fast-shear azimuth from those in the reference data. Additionally, changes may be observed with respect to the cross-dipole dispersions relative to those in the reference data. Based on this analysis in block 148, various fracture attributes may be determined. For example, multiple fast flexural dispersions and reflections; and/or larger flexural slownesses at higher frequencies, as represented by block 150, may be used to determine short axial fractures, as represented by block 152. Similarly, TIH dipole dispersion signatures, as indicated by block 154, may be used to determine long axial fractures as represented by block 156. A fast shear azimuth may be indicative of a fracture strike, as represented by block 158. An estimate of depth interval showing fracture-induced shear anisotropy, as represented by block 160, may be used to determine height or axial extent of the fracture 58, as represented by block 162.

Figure 21:
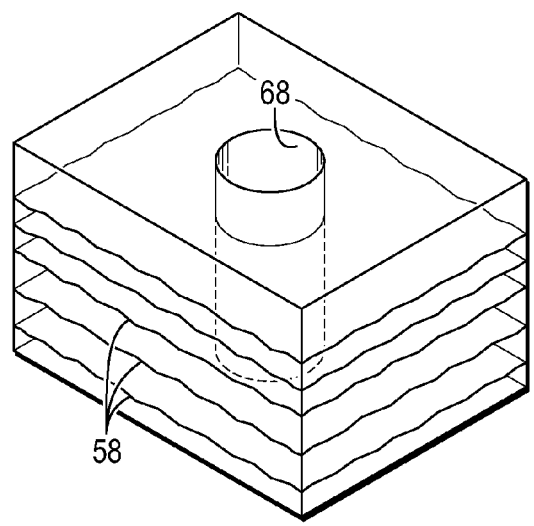
FIG. 21 is a schematic illustration of a vertical wellbore with multiple horizontal fractures intersecting a fluid-filled borehole, according to an embodiment of the disclosure.
Figure 22:
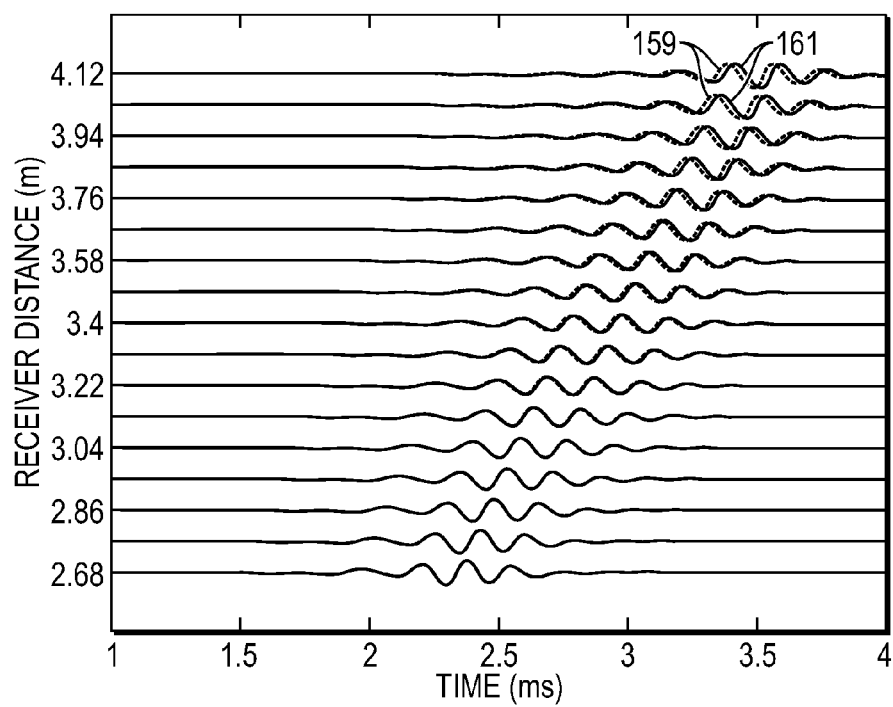
FIG. 22 is a graphical example showing a comparison of monopole waveforms in the absence and presence of fractures filled with a soft sediment, according to an embodiment of the disclosure.

Sonic data analyses also may be performed before and after introduction of multiple cross-sectional fractures 58 to similarly determine fracture attributes. In FIG. 21, multiple cross-sectional fractures 58 are illustrated as intersecting a fluid-filled borehole 68. FIG. 22 provides a graph of time versus receiver distance for comparing monopole waveforms in the absence and presence of cross-sectional fractures 58. In this particular example, the graph compares monopole waveforms in the absence and presence of 20 cross-sectional fractures of 2 cm thickness filled with a soft sediment (DTc=109 us/ft; DTs=174 us/ft; rho=2.4 g/cc). The formation parameters in the absence of fractures are DTc=93 us/ft; DTs=149 us/ft; and rho=2.5 g/cc. The graph curves 159 and curves 161, respectively, denote the monopole waveforms without and with fractures 58. It should be noted that amplitudes of the monopole waveforms are not substantially affected by sediment filled cross-sectional fractures.

Figure 23:
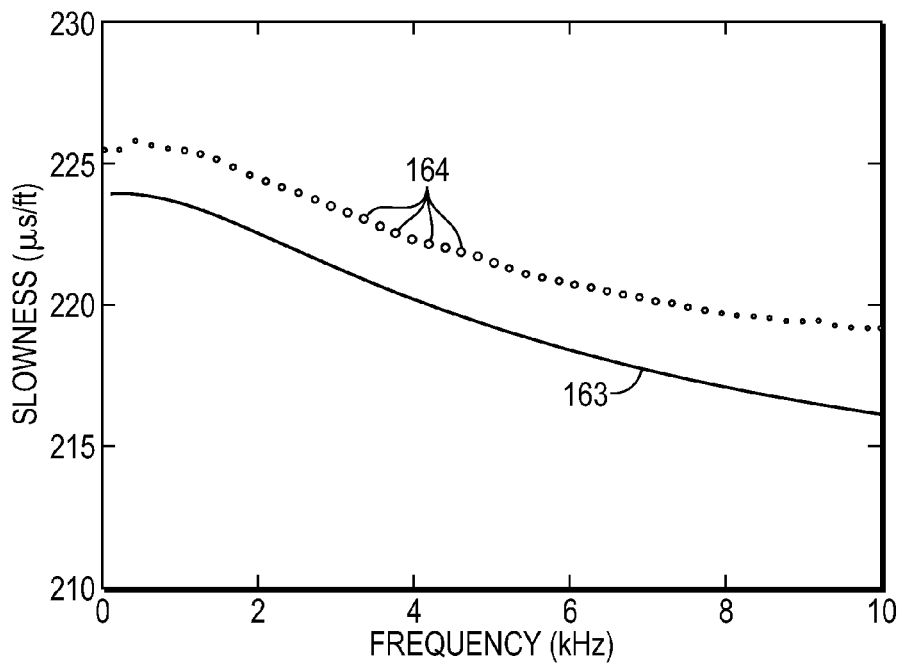
FIG. 23 is a graphical example of monopole Stoneley dispersions in the absence and presence of cross-sectional fractures, according to an embodiment of the disclosure.
Figure 24:
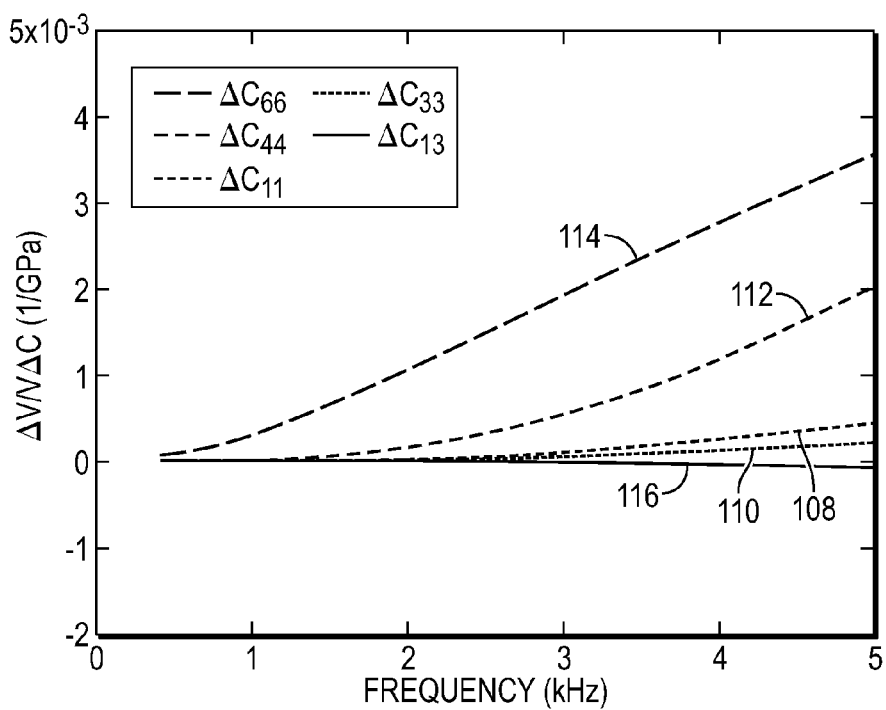
FIG. 24 is a graphical example of fractional changes in the Stoneley wave velocity due to changes in the five TI-elastic constants plotted as a function of frequency, according to an embodiment of the disclosure.

Referring generally to FIG. 23, a graph plotting frequency versus slowness is provided. In this graphical example, a curve 163 represents the monopole Stoneley dispersion in the absence of any fractures. The line of circles 164 denotes the Stoneley dispersion in the presence of the 20 cross-sectional fractures 58. FIG. 24 illustrates fractional changes in the Stoneley wave velocity for 1 GPa change in the five TI-elastic constants plotted as a function of frequency. In this example, the five curves again comprise first curve 108 representing $\Delta C_{11}$, second curve 110 representing $\Delta C_{33}$, third curve 112 representing $\Delta C_{44}$, fourth curve 114 representing $\Delta C_{66}$, and fifth curve 116 representing $\Delta C_{13}$. It should be noted that sensitivities of Stoneley dispersion to changes in the $C_{13}$, $C_{33}$, and $C_{11}$ are negligibly small compared to changes in the $C_{44}$ and $C_{66}$.

Figure 25:
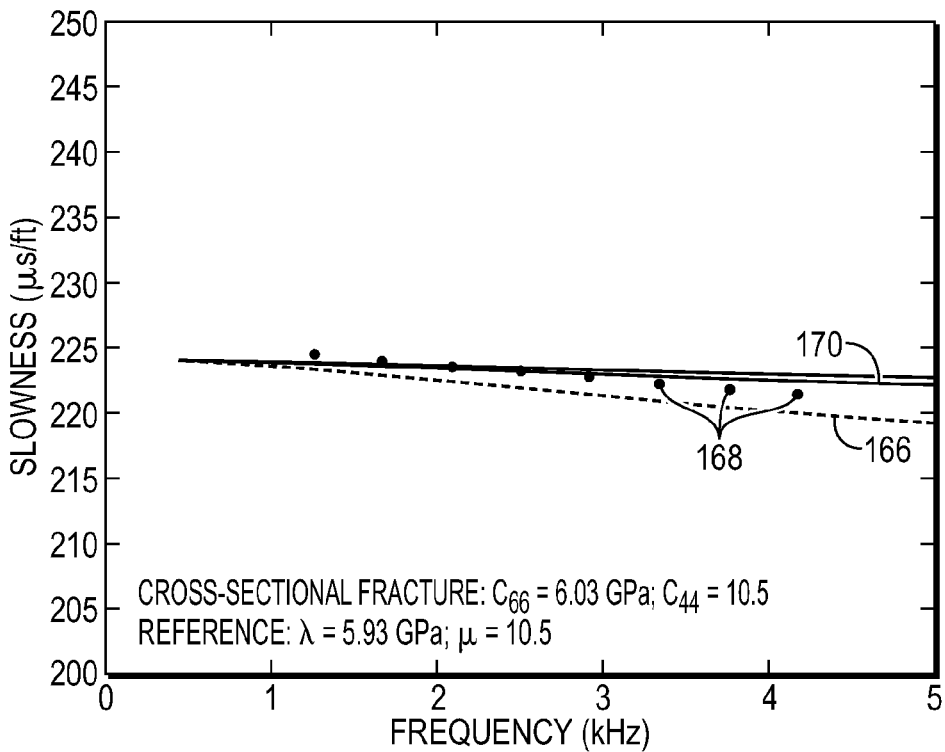
FIG. 25 is a graphical example of monopole Stoneley dispersion in the absence and presence of an axial fracture with other input data, according to an embodiment of the disclosure.

In the graph illustrated in FIG. 25, frequency is again plotted versus slowness and a dashed curve 166 represents the monopole Stoneley dispersion in the absence of any fractures 58. The star markers 168 denote the input slowness-frequency pairs used in the inversion algorithm for estimating changes in $C_{66}$ and $C_{44}$. The curve 170 illustrates the predicted Stoneley dispersion in the presence of cross-sectional fractures 58 using the inverted $C_{66}$ and $C_{44}$. Good agreement between the predicted Stoneley dispersion and input data validates the proposed workflow.

Figure 26:
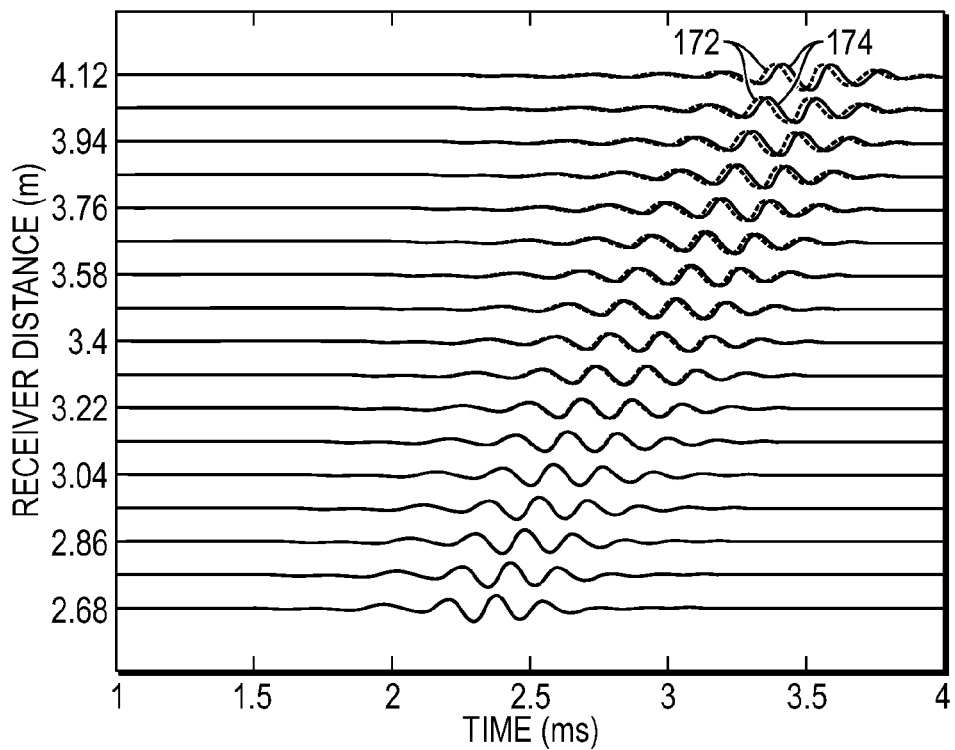
FIG. 26 is a graphical comparison of dipole waveforms in the absence and presence of fractures filled with soft sediment, according to an embodiment of the disclosure.

FIG. 26 provides a graph plotting time versus receiver distance. The graph in this example provides a comparison of dipole waveforms in the absence and presence of 20 cross-sectional fractures 58 of 2 cm thickness filled with a soft sediment (DTc=109 us/ft; DTs=174 us/ft; rho=2.4 g/cc). The formation parameters in the absence of fractures are DTc=93 us·ft; DTs=149 us/ft; and rho=2.5 g/cc. The curves 172 and curves 174, respectively, denote the dipole waveforms without and with fractures 58.

Figure 27:
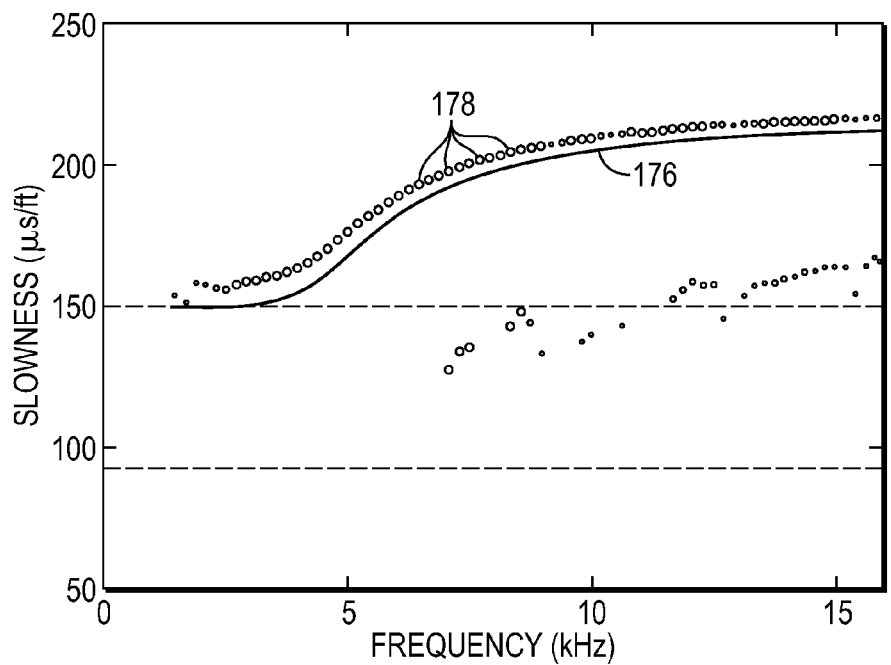
FIG. 27 is a graphical example of dipole flexural dispersion in the absence and presence of 20 cross-sectional fractures, according to an embodiment of the disclosure.
Figure 28:
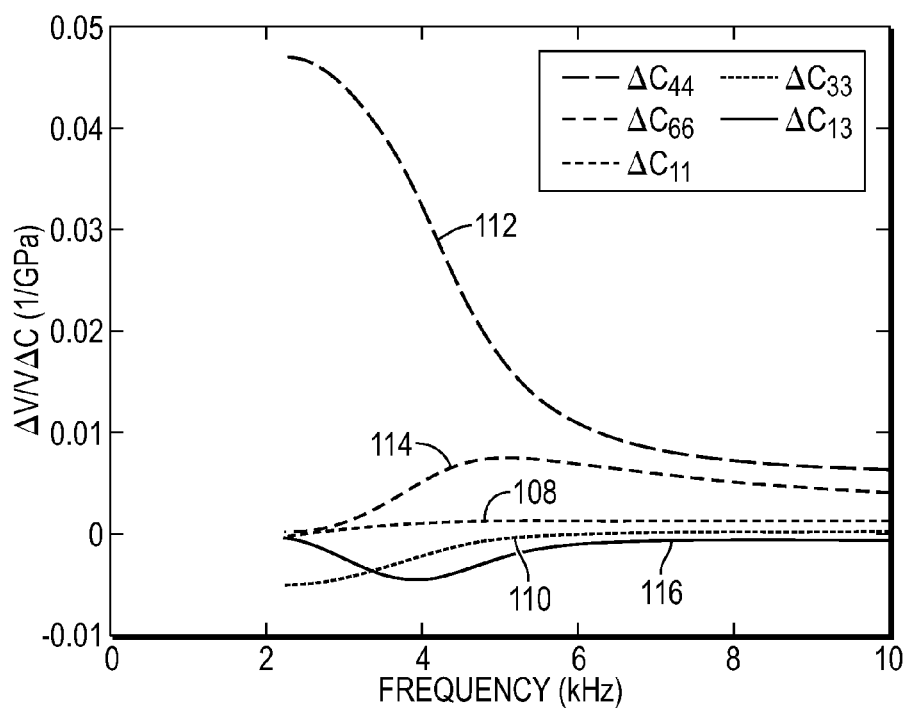
FIG. 28 is a graphical example of fractional changes in the dipole dispersion due to changes in the five TI-elastic constants plotted as a function of frequency, according to an embodiment of the disclosure.

In FIG. 27, a graph is provided plotting frequency versus slowness and a curve 176 represents the dipole flexural dispersion in the absence of fractures 58. Additionally, the line of circles 178 denotes the flexural dispersion in the presence of 20 cross-sectional fractures 58. FIG. 28 again displays fractional changes in the dipole dispersion caused by a 1 GPa change in the five TI-elastic constants plotted as a function of frequency and represented by curves 108, 110, 112, 114 and 116.

Referring generally to FIG. 29, another graph is provided plotting frequency versus slowness. In this example, a curve 180 represents the dipole flexural dispersion in the absence of fractures 58. The star markers 182 denote the inputs to the inversion algorithm obtained from the dipole dispersion generated by a dipole source in the presence of cross-sectional fractures. Differences between the (measured) and reference dipole dispersions are inverted to estimate the shear moduli $C_{44}$, $C_{66}$ and $C_{13}$ in the fractured formation. The curve 184 illustrates the predicted dipole dispersion using the inverted shear moduli $C_{44}$, $C_{66}$ and $C_{13}$. Good agreement between the predicted dipole dispersion and the star markers 182 confirms the accuracy of the inversion algorithm.

By way of summary with respect to cross-sectional fractures, multiple cross-sectional fractures 58 filled with soft sediments 186, as illustrated in FIG. 30, cause both the borehole Stoneley and dipole flexural dispersions to become slower than in the unfractured formation. Changes in the Stoneley dispersion are rather small on the order of 1 to 2% as displayed in FIG. 25. Consequently, inversion of the Stoneley dispersion for the shear modulus $C_{66}$ can be challenging. Under these circumstances, the present procedure/methodology provides a technique of inverting changes in the dipole flexural dispersion for the TI-constants $C_{44}$ (=$C_{55}$) and $C_{66}$ together with $C_{13}$ caused by the presence of such cross-sectional fractures 58. Good agreement between the measured and predicted dipole dispersions obtained using the inverted TI-constants $C_{44}$, $C_{66}$, and $C_{13}$ confirms the accuracy of the inversion algorithm as shown in FIG. 29.

FIG. 31 summarizes a plurality of techniques which may be used to help identify certain attributes of cross-sectional fractures from analyses of the monopole and dipole waveforms acquired in a fluid-filled the borehole, e.g. borehole 68. For example, the fracture strike/plane may be identified via evaluation of the reflection of monopole and dipole waves and via no dipole shear anisotropy (TIV signature). Fracture length may be determined by a variety of techniques. For example, long fractures of greater than about 1 m may be determined via TIV anisotropy signatures. Short fractures of less than 1 m may be determined via evaluation of incoherent dispersions. Multiple fractures filled with mud may be evaluated via Stoneley and dipole dispersions indicated faster through a wide range of frequencies and/or via a large attenuation across the receiver array. By way of additional example, fractures filled with soft sediments, e.g. loose sand, may be evaluated via Stoneley and dipole dispersions indicated slower through a wide range of frequencies and/or less attenuation across the receiver array.

Figure 32:
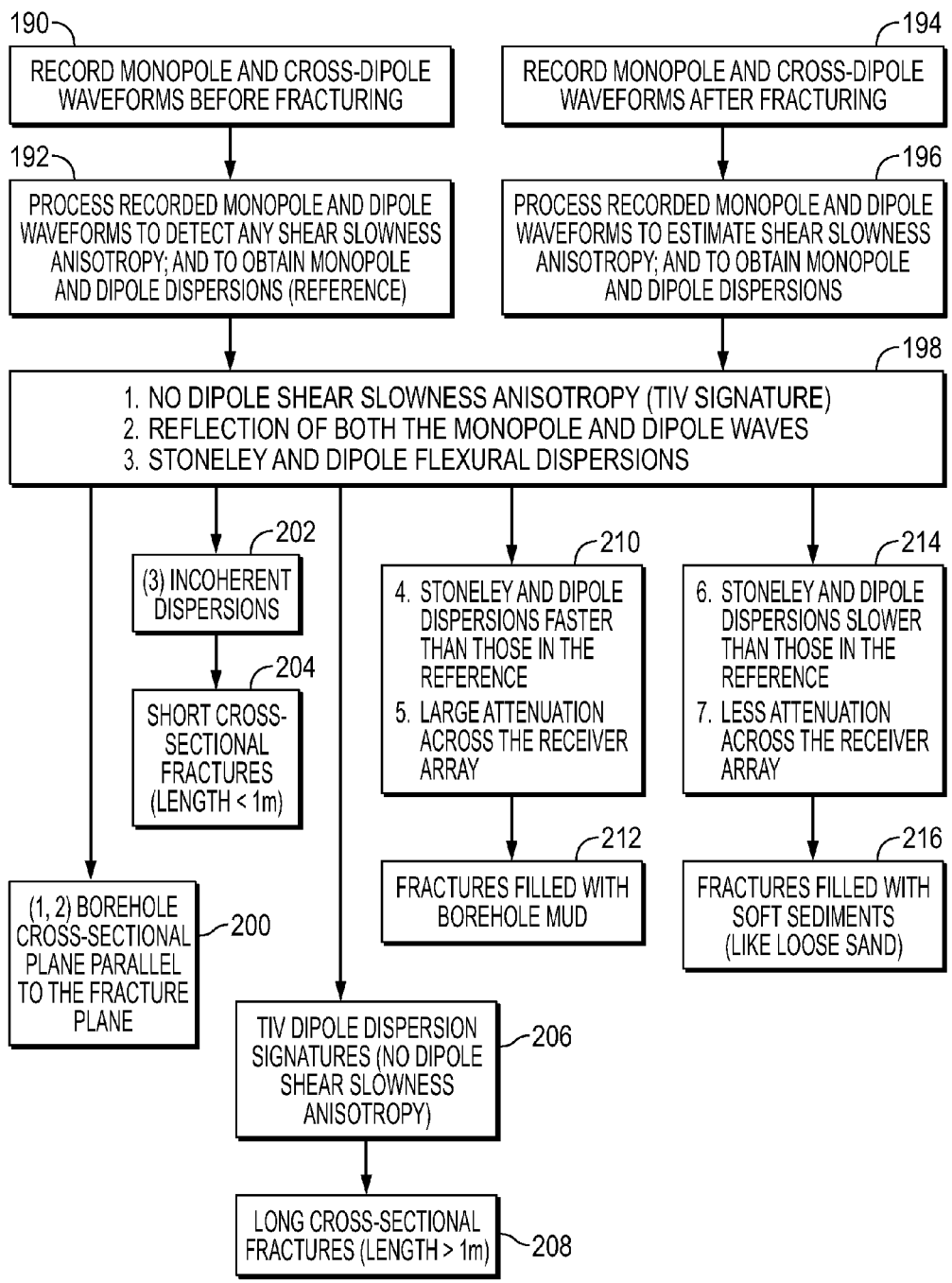
FIG. 32 is a flowchart representing an example of a methodology to identify cross-sectional fracture attributes from analyses of monopole and dipole waveforms, according to an embodiment of the disclosure.

Referring generally to FIG. 32, a flowchart is provided to illustrate an example of a methodology to identify cross-sectional fracture attributes from analyses of monopole and dipole waveforms. In this example, monopole and cross-dipole waveforms are recorded before fracturing, as indicated by block 190. By way of example, the waveforms may be recorded in a suitable memory, such as memory 76 of data collection and processing system 62. The recorded dipole waveforms are then processed on, for example, processing system 72 to detect shear slowness anisotropy and to obtain monopole and dipole dispersions, thus establishing reference values as indicated by block 192.

Monopole and cross-dipole waveforms also are recorded, e.g. recorded in memory 76, after fracturing of formation 54, as indicated by block 194. The recorded "after fracturing" monopole and dipole waveforms are then processed on, for example, processing system 72 to estimate shear slowness anisotropy and to obtain monopole and dipole dispersions, as indicated by block 196. The data from the processed, monopole and dipole waveforms after fracturing can then be compared to the reference data from the processed, monopole and dipole waveforms established prior to fracturing.

As indicated by block 198, for example, a comparison may be made with respect to no dipole shear slowness anisotropy (TIV signature), reflection of both the monopole and dipole waves, and Stoneley and dipole flexural dispersions. Changes in the TIV signature and in the reflection of monopole and dipole waves provide information on formation fracture attributes in the borehole cross-sectional plane parallel to the fracture plane, as indicated by block 200. Similarly, the comparison of Stoneley and dipole flexural dispersions may indicate incoherent dispersions, as indicated by block 202. The incoherent dispersions provide information on fracture attributes regarding short cross-sectional fractures, e.g. cross-sectional fractures having a length less than 1 m, as indicated by block 204. Changes between the reference data and the "after fracturing" data with respect to TIV dipole dispersion signatures, as indicated by block 206, can be used to provide information on fracture attributes regarding long cross-sectional fractures, e.g. cross-sectional fractures having a length greater than 1 m, as indicated by block 208.

Additionally, the before and after fracturing waveform data may be processed and compared to determine whether Stoneley and dipole dispersions after fracturing are faster than those in the reference data and whether a large attenuation occurs across the array of receivers 70, as indicated by block 210. This comparison may be used to provide information as to whether fractures 58 are filled with borehole fluid, e.g. mud, as indicated by block 212. The before and after fracturing waveform data also may be processed and compared to determine whether Stoneley and dipole dispersions after fracturing are slower than those in the reference data and whether less attenuation occurs across the array of receivers 70, as indicated by block 214. This comparison may be used to provide information as to whether fractures 58 are filled with soft sediments, e.g. loose sand, as indicated by block 216.

Figure 33:
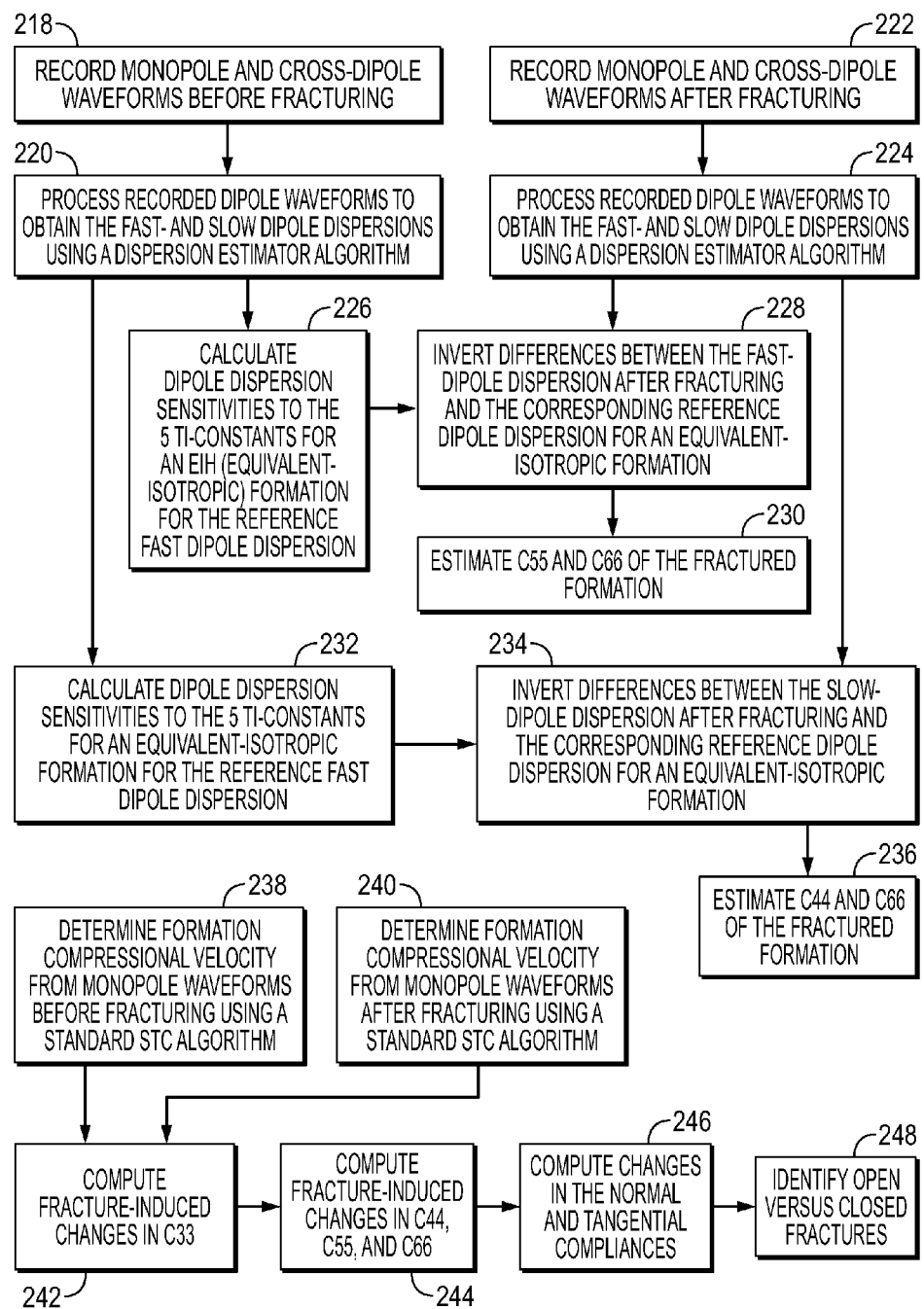
FIG. 33 is a flowchart representing an example of a methodology to estimate transversely-isotropic anisotropy with a horizontal axis of symmetry (TIH) anisotropic constants in the presence of axial fractures, according to an embodiment of the disclosure.

Referring generally to FIG. 33, a flowchart is provided to illustrate an example of a methodology to determine various fracture attributes via an estimate of TIH anisotropic constants in the presence of axial fractures. It should be noted that the EIH formation referenced in the flowchart denotes an equivalent-isotropic and radially homogeneous formation. In this example, monopole and cross-dipole waveforms are recorded before fracturing, as indicated by block 218. By way of example, the waveforms may be recorded in a suitable memory, such as memory 76 of data collection and processing system 62. The recorded dipole waveforms are then processed on, for example, processing system 72 to obtain the fast dipole dispersions and slow dipole dispersions, as indicated by block 220. By way of example, the fast dipole dispersions and slow dipole dispersions may be obtained using a suitable dispersion estimator algorithm as described above.

Monopole and cross-dipole waveforms also are recorded, e.g. recorded in memory 76, after fracturing of formation 54, as indicated by block 222. The recorded "after fracturing" dipole waveforms are then processed on, for example, processing system 72 to obtain the fast dipole dispersions and slow dipole dispersions using, for example, a dispersion estimator algorithm, as indicated by block 224. The fast dipole dispersions reference data can then be used to calculate dipole dispersion sensitivities to the five TI-constants for an EIH formation, as represented by block 226. The differences between the fast dipole dispersion after fracturing and the corresponding reference dipole dispersion for an equivalent-isotropic formation can then be inverted, as indicated by block 228. The inversion data may be used to determine fracture attributes, such as estimating $C_{55}$ and $C_{66}$ of the fractured formation, as indicated by block 230.

Similarly, the data may be used to estimate $C_{44}$ and $C_{66}$ of the fractured formation. For example, the slow dipole dispersions reference data can then be used to calculate dipole dispersion sensitivities to the five TI-constants for an equivalent-isotropic formation, as represented by block 232. The differences between the slow dipole dispersion after fracturing and the corresponding reference dipole dispersion for an equivalent-isotropic formation can then be inverted, as indicated by block 234. The inversion data may be used to determine fracture attributes, such as estimating $C_{44}$ and $C_{66}$ of the fractured formation, as indicated by block 236.

The recorded raw and/or processed data may be used to determine various additional and/or other attributes related to the fractures. For example, formation compressional velocity may be determined from monopole waveforms before fracturing using a standard STC (Slowness-Time Coherence) algorithm, as indicated by block 238. Similarly, formation compressional velocity may be determined from monopole waveforms after fracturing using a standard STC algorithm, as indicated by block 240. The formation compressional velocity data from monopole waveforms before and after fracturing may be used to compute fracture-induced changes in $C_{33}$, as indicated by block 242. This data may then be used to compute fracture-induced changes in $C_{44}$, $C_{55}$, and $C_{66}$, as indicated by block 244. The data may further be used to compute changes in the normal and tangential compliances, as indicated by block 246. The data may further be used to determine additional fracture attributes such as identifying open versus closed fractures, as indicated by block 248.

Figure 34:
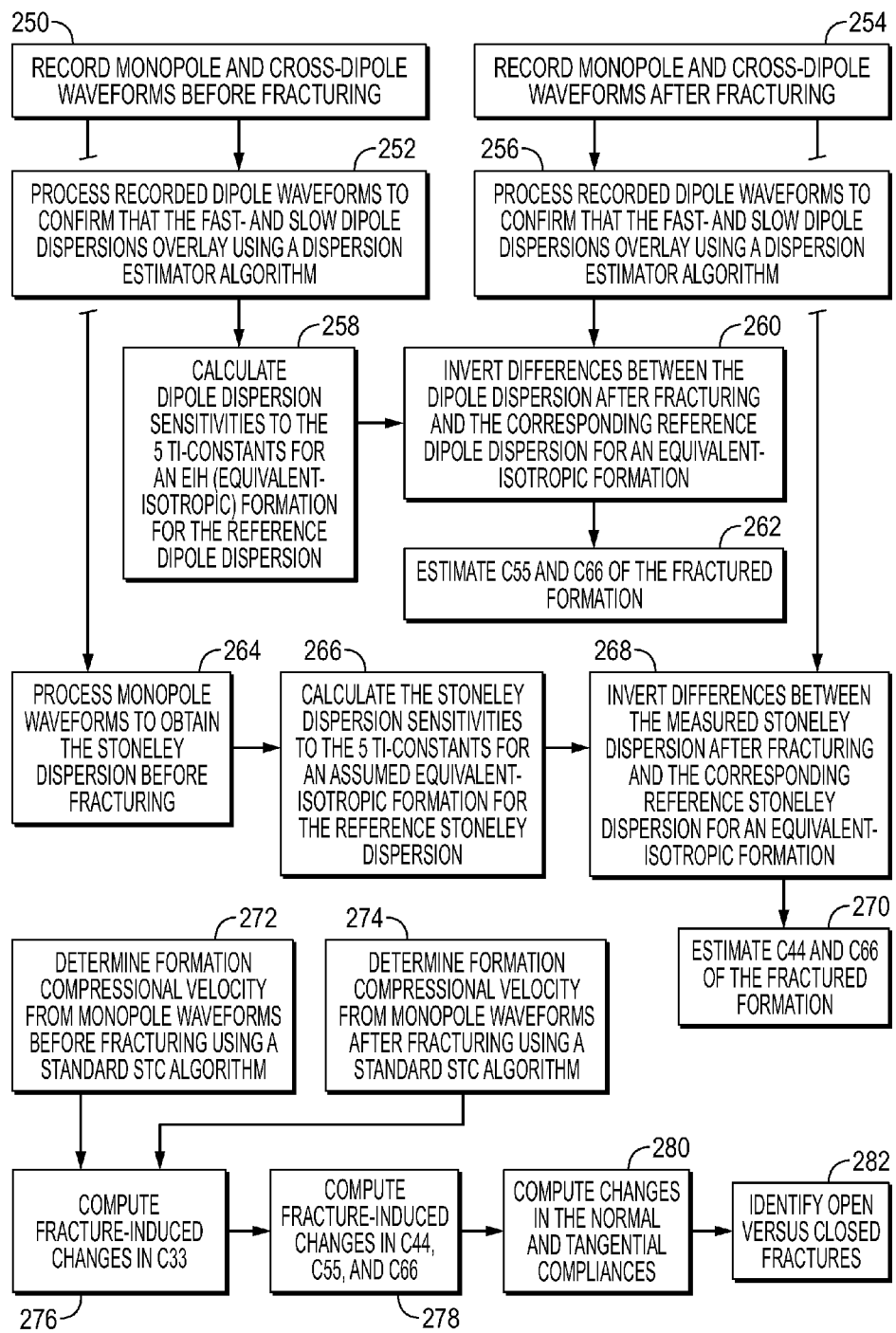
FIG. 34 is a flowchart representing an example of a methodology to estimate transversely-isotropic anisotropy with a vertical axis of symmetry (TIV) anisotropic constants in the presence of axial fractures, according to an embodiment of the disclosure.

Referring generally to FIG. 34, a flowchart is provided to illustrate an example of a methodology to determine various additional fracture attributes. The flowchart illustrates a methodology to estimate TIV anisotropic constants in the presence of cross-sectional fractures. In this example, monopole and cross-dipole waveforms are recorded before fracturing, as indicated by block 250. By way of example, the waveforms may be recorded in a suitable memory, such as memory 76 of data collection and processing system 62. The recorded dipole waveforms are then processed on, for example, processing system 72 to confirm that fast dipole and slow dipole dispersions overlay, as indicated by block 252. By way of example, the fast dipole and slow dipole dispersions may be confirmed using a suitable dispersion estimator algorithm as described above.

Monopole and cross-dipole waveforms also are recorded, e.g. recorded in memory 76, after fracturing of formation 54, as indicated by block 254. The recorded after fracturing dipole waveforms are then processed on, for example, processing system 72 to confirm that the fast dipole and slow dipole dispersions overlay using, for example, a dispersion estimator algorithm, as indicated by block 256. Subsequently, a calculation of dipole dispersion sensitivities to the five TI-constants of an EIH formation for the reference dipole dispersion is performed, as represented by block 258. The differences between the dipole dispersion after fracturing and the corresponding reference dipole dispersion for an equivalent-isotropic formation can then be inverted, as indicated by block 260. The inversion data may be used to determine fracture attributes, such as estimating $C_{55}$ and $C_{66}$ of the fractured formation, as indicated by block 262.

Similarly, the data may be used to estimate $C_{44}$ and $C_{66}$ of the fractured formation. For example, the monopole waveforms may be processed to obtain the Stoneley dispersion before fracturing, as represented by block 264. This dispersion data may then be used to calculate the Stoneley dispersion sensitivities to the five TI-constants with respect to an equivalent-isotropic formation for the reference Stoneley dispersion, as represented by block 266. The differences between the measured Stoneley dispersion after fracturing and the corresponding reference Stoneley dispersion for an equivalent-isotropic formation can then be inverted, as indicated by block 268. The inversion data may be used to determine fracture attributes, such as estimating $C_{44}$ and $C_{66}$ of the fractured formation, as indicated by block 270.

The recorded raw and/or processed data may be used to determine various additional and/or other attributes related to the fractures 58. For example, formation compressional velocity may similarly be determined from monopole waveforms before fracturing using a standard STC algorithm, as indicated by block 272. Additionally, formation compressional velocity may be determined from monopole waveforms after fracturing using a standard STC algorithm, as indicated by block 274. The formation compressional velocity data from monopole waveforms before and after fracturing may be used to compute fracture-induced changes in $C_{33}$, as indicated by block 276. This data may then be used to compute fracture-induced changes in $C_{44}$, $C_{55}$, and $C_{66}$, as indicated by block 278. The data may further be used to compute changes in the normal and tangential compliances, as indicated by block 280. The data may further be used to determine additional fracture attributes such as identifying open versus closed fractures, as indicated by block 282.

Accordingly, the systems and methodologies described herein may be used in a variety of formations to determine many types of fracture attributes. In many applications, for example, a rotationally invariant set of horizontal fractures aligned with the $X_1$-$X_2$ plane in an isotropic formation can be described in terms of a transversely-isotropic (TIV) anisotropy with a vertical ($X_3$-) axis of symmetry. In contrast, a rotationally invariant set of vertical fractures aligned with the $X_2$-$X_3$ plane in an isotropic formation can be described in terms of a transversely-isotropic (TIH) anisotropy with a horizontal ($X_1$-) axis of symmetry. Changes in the borehole Stoneley and cross-dipole dispersions caused by the introduction of either vertically or horizontally aligned fractures from those in the unfractured and effectively isotropic formation can be inverted to estimate anisotropic constants for the fractured rock. Relative magnitudes of anisotropic constants can be related to the normal and tangential compliances of the fractured formation as well.

Embodiments described herein further provide a new technique to estimate changes in the shear moduli $C_{66}$ and $C_{44}$ caused by the presence of cross-sectional fractures from the measured Stoneley and dipole flexural dispersions. This technique is based on a frequency dependent integral formulation that relates fractional changes in the Stoneley and flexural velocities to incremental changes in the TI-elastic constants from assumed equivalent isotropic formation elastic constants. Based on the sensitivity of modal velocities to changes in the anisotropic constants at a given axial wavenumber or frequency, the inversion algorithm successfully inverts multiple elastic constants from the measured Stoneley and cross-dipole dispersions.

An iterative inversion algorithm inverts either the borehole Stoneley or one of the dipole flexural dispersions for an elastic constant with the highest sensitivity over an optimal bandwidth followed by inversions for other elastic constants with progressively reduced sensitivity over a given bandwidth. The iterative process may be stopped when the successive differences between the predicted and measured Stoneley or dipole dispersions together with sensitivities of remaining elastic constants become negligibly small.

Inversion of a bandlimited Stoneley dispersion yields estimates of the shear moduli $C_{66}$ and $C_{44}$ in a borehole cross-sectional fracture simulated in terms of a TIV-anisotropy. In contrast, inversion of the dipole flexural dispersion in the presence of a cross-sectional fracture provides estimates of the shear moduli $C_{44}$, $C_{66}$, and the elastic constant $C_{13}$.

Vertically aligned borehole axial fractures can be simulated in terms of TIH-anisotropy. Inversion of the fast flexural dispersion produced by a dipole source parallel to the axial fracture can be inverted to obtain the shear moduli $C_{55}$ and $C_{66}$ of the fractured system. On the other hand, inversion of the slow flexural dispersion produced by a dipole source perpendicular to the axial fracture provides estimates of the shear moduli $C_{44}$ and $C_{66}$ together with an estimate of $C_{13}$ of the fractured formation. Insofar as the Stoneley dispersion exhibits some sensitivity to the shear modulus $C_{66}$, the iterative inversion algorithm yields estimates of the shear modulus $C_{66}$ in the presence of borehole axial fractures The technique may be employed in many types of wells having a variety of boreholes. The wells may comprise deviated boreholes, single boreholes, multiple boreholes, as well as many arrangements and sizes of boreholes. The methodology can further be used with a wide variety of fracturing techniques used to form many types of fractures in a given formation. Similarly, the methodology and analysis may be performed to determine fracture attributes in a wide range of formations and subterranean environments.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A method, comprising:
   receiving waveforms of acoustic waves acquired by an array of receivers based on output from a plurality of acoustic sources arranged within a borehole formed in a formation;
   processing the waveforms of acoustic waves to obtain dispersions wherein the dispersions comprise monopole dispersions, dipole dispersions or at least one monopole dispersion and at least one dipole dispersion;
   for a formation reference state, defining reference state dispersions;
   estimating multiple elastic constants in the formation by inverting differences between the dispersions and the reference state dispersions over a chosen frequency bandwidth for a sequence of elastic constants with progressively decreasing sensitivities;
   based at least in part on the estimated multiple elastic constants, determining one or more fracture attributes of the formation; and
   outputting completion design information for production of hydrocarbons from the formation based at least in part on at least one of the one or more fracture attributes.

2. The method as recited in claim 1, wherein the one or more fracture attributes include at least one member selected from a group consisting of fracture orientation, fracture strike/plane, fracture height, and fracture length.

3. The method as recited in claim 1, further comprising establishing whether fractures in the formation are filled with fluid or soft sediments.

4. A system for determining fracture attributes, comprising:
   a processor and memory that stores processor-executable instructions to instruct the system to:
      receive waveforms of acoustic waves acquired by an array of receivers based on output from a plurality of acoustic sources arranged within a borehole formed in a formation;
      process the waveforms of acoustic waves to obtain dispersions wherein the dispersions comprise monopole dispersions, dipole dispersions or at least one monopole dispersion and at least one dipole dispersion;
      for a formation reference state, define reference state dispersions;
      estimate multiple elastic constants in the formation by inversion of differences between the dispersions and the reference state dispersions over a chosen frequency bandwidth for a sequence of elastic constants with progressively decreasing sensitivities;
      based at least in part on the estimated multiple elastic constants, determine one or more fracture attributes of the formation; and
      output completion design information for production of hydrocarbons from the formation based at least in part on at least one of the one or more fracture attributes.

5. The system as recited in claim 4, comprising processor-executable instructions to determine whether one or more fractures in the formation are filled with fluids or soft sediments.

6. The system as recited in claim 4, wherein the array of receivers is positioned at least in part in the borehole.

* * * * *